United States Patent [19]

Kamezaki et al.

[11] Patent Number: 5,021,276
[45] Date of Patent: Jun. 4, 1991

[54] OPTICAL DATA RECORDING MEDIUM AND MANUFACTURING METHOD THEREOF

[75] Inventors: Hisamitsu Kamezaki; Masashi Suenaga, both of Ibaraki; Osamu Saito, Takatsuki; Shin-ichiro Iuchi, Ibaraki; Hitoshi Watanabe, Ibaraki; Hideo Fujiwara, Ibaraki; Yoshitane Tuburaya, Toride, all of Japan

[73] Assignee: Hitachi Maxell, Ltd., Osaka, Japan

[21] Appl. No.: 367,721

[22] Filed: Jun. 19, 1989

[30] Foreign Application Priority Data

| Jun. 20, 1988 | [JP] | Japan | 63-150065 |
| Oct. 31, 1988 | [JP] | Japan | 63-273221 |
| Jan. 11, 1989 | [JP] | Japan | 1-2882 |
| Feb. 28, 1989 | [JP] | Japan | 1-45300 |
| Mar. 23, 1989 | [JP] | Japan | 1-69265 |

[51] Int. Cl.$^5$ .............................. B32B 3/02
[52] U.S. Cl. ...................... 428/64; 428/65; 428/412; 428/522; 428/913; 346/76 L; 346/135.1; 369/288

[58] Field of Search .............. 428/64, 65, 195, 412, 428/522, 913; 346/76 L, 135.1; 369/288

[56] References Cited

U.S. PATENT DOCUMENTS

| 4,101,907 | 7/1978 | Bell et al. ........................ 346/76 L |
| 4,448,827 | 5/1984 | Luijben et al. .................. 428/201 |
| 4,735,839 | 4/1988 | Sato et al. ........................ 428/64 |

FOREIGN PATENT DOCUMENTS

| 3500819 | 10/1985 | Fed. Rep. of Germany . |
| 3622256 | 1/1987 | Fed. Rep. of Germany . |
| 2152686 | 8/1985 | United Kingdom . |

*Primary Examiner*—Patrick J. Ryan
*Attorney, Agent, or Firm*—Birch, Stewart, Kolasch & Birch

[57] ABSTRACT

An optical data recording medium having a recording layer with or without an underlayer layered on a transparent substrate, wherein said recording layer is composed of a difficult-to-dissolve-in-water organic dye type material on which a thin layer composed of a surface active polymer as a hydrophilic material, which is denaturated by cross-linking.

23 Claims, 26 Drawing Sheets

FIG. 8

| | | |
|---|---|---|
| (I) ⬡ | (VIII) ⬡–⬡ | (XV) Cl,Cl–⬡ |
| (II) I–⬡ | (IX) (H₃C)₂–⬡ | (XVI) ⬡⬡ |
| (III) Br–⬡ | (X) H₅C₂O–⬡ | (XVII) ⬡⬡ |
| (IV) Cl–⬡ | (XI) (H₅C₂)₂–⬡ | (XVIII) ⬢⬢ |
| (V) H₃C–⬡ | (XII) (H₃C)₂N–⬡ | |
| (VI) H₅C₂–⬡ | (XIII) (CH₃)₂CH–⬡ | |
| (VII) H₃CO–⬡ | (XIV) H₃CO–⬡ | |

FIG. 9

| NO. OF COMPOUND | R | R' | ··A·· | ···B··· | -①= | X |
|---|---|---|---|---|---|---|
| 1 | CH₃ | CH₃ | I | H₃C\C/CH₃ | II | I |
| 2 | CH₃ | CH₃ | IV | H₃C\C/CH₃ | II | I |
| 3 | CH₃ | CH₃ | V | H₃C\C/CH₃ | II | I |
| 4 | CH₃ | CH₃ | XII | H₃C\C/CH₃ | I | I |
| 5 | CH₃ | CH₃ | XVI | H₃C\C/CH₃ | I | I |
| 6 | C₂H₅ | C₂H₅ | I | H₃C\C/CH₃ | I | I |
| 7 | C₂H₅ | C₂H₅ | I | H₃C\C/CH₃ | III | I |
| 8 | C₂H₅ | C₂H₅ | IV | H₃C\C/CH₃ | III | I |
| 9 | C₂H₅ | C₂H₅ | XVI | H₃C\C/CH₃ | VII | I |
| 10 | C₃H₇ | C₃H₇ | I | H₃C\C/CH₃ | I | I |
| 11 | C₃H₇ | C₃H₇ | I | -CH=CH- | X | I |
| 12 | C₃H₇ | C₃H₇ | X | -S- | IV | I |
| 13 | (CH₂)₃SO₃H | (CH₂)₃SO₃H | I | H₃C\C/CH₃ | I | I |
| 14 | (CH₂)₂COOH | (CH₂)₂COOH | I | H₃C\C/CH₃ | I | I |
| 15 | (CH₂)₂OCH₃ | (CH₂)₂OCH₃ | I | H₃C\C/CH₃ | I | I |

FIG. 10

| NO. OF COMPOUND | R | R' | ··A·· | ···B··· | $-\text{T}=$ | X |
|---|---|---|---|---|---|---|
| 16 | CH₃ | C₂H₅ | I | H₃C\C/CH₃ | I | I |
| 17 | CH₃ | C₃H₇ | I | H₃C\C/CH₃ | I | I |
| 18 | CH₃ | C₄H₉ | I | H₃C\C/CH₃ | I | I |
| 19 | CH₃ | C₅H₁₁ | I | H₃C\C/CH₃ | I | I |
| 20 | CH₃ | C₈H₁₇ | I | H₃C\C/CH₃ | I | I |
| 21 | CH₃ | C₁₄H₂₉ | I | H₃C\C/CH₃ | I | I |
| 22 | CH₃ | C₁₈H₃₇ | I | H₃C\C/CH₃ | I | I |
| 23 | C₂H₅ | C₃H₇ | I | H₃C\C/CH₃ | I | I |
| 24 | C₂H₅ | C₅H₁₁ | I | H₃C\C/CH₃ | I | I |
| 25 | C₂H₅ | C₈H₁₇ | I | H₃C\C/CH₃ | I | I |
| 26 | C₂H₅ | C₁₄H₂₉ | I | H₃C\C/CH₃ | I | I |
| 27 | C₃H₇ | C₅H₁₁ | XVI | H₃C\C/CH₃ | I | I |
| 28 | C₃H₇ | C₈H₁₇ | XVI | H₃C\C/CH₃ | I | I |
| 29 | C₃H₇ | C₁₄H₂₉ | XVI | H₃C\C/CH₃ | I | I |

FIG. 11

| NO. OF COMPOUND | R | R' | ···A··· | ···B··· | -①= | X |
|---|---|---|---|---|---|---|
| 30 | CH₃ | CH₃ | I | H₃C\C/CH₃ | II | CℓO₄ |
| 31 | CH₃ | CH₃ | IV | H₃C\C/CH₃ | II | CℓO₄ |
| 32 | CH₃ | CH₃ | V | H₃C\C/CH₃ | II | CℓO₄ |
| 33 | CH₃ | CH₃ | XII | H₃C\C/CH₃ | I | CℓO₄ |
| 34 | CH₃ | CH₃ | XVI | H₃C\C/CH₃ | I | CℓO₄ |
| 35 | C₂H₅ | C₂H₅ | I | H₃C\C/CH₃ | I | CℓO₄ |
| 36 | C₂H₅ | C₂H₅ | I | H₃C\C/CH₃ | III | CℓO₄ |
| 37 | C₂H₅ | C₂H₅ | IV | H₃C\C/CH₃ | III | CℓO₄ |
| 38 | C₂H₅ | C₂H₅ | XVI | H₃C\C/CH₃ | VII | CℓO₄ |
| 39 | C₃H₇ | C₃H₇ | I | H₃C\C/CH₃ | I | CℓO₄ |

FIG. 12

NO. OF COMPOUND

| | R | R' | ..A.. | ...B... | -①= | X |
|---|---|---|---|---|---|---|
| 40 | CH$_3$ | CH$_3$ | I | H$_3$C\C/CH$_3$ | II | PF$_6$ |
| 41 | CH$_3$ | CH$_3$ | IV | H$_3$C\C/CH$_3$ | II | PF$_6$ |
| 42 | CH$_3$ | CH$_3$ | V | H$_3$C\C/CH$_3$ | II | PF$_6$ |
| 43 | CH$_3$ | CH$_3$ | XII | H$_3$C\C/CH$_3$ | I | PF$_6$ |
| 44 | CH$_3$ | CH$_3$ | XVI | H$_3$C\C/CH$_3$ | I | PF$_6$ |
| 45 | C$_2$H$_5$ | C$_2$H$_5$ | I | H$_3$C\C/CH$_3$ | I | PF$_6$ |
| 46 | C$_2$H$_5$ | C$_2$H$_5$ | I | H$_3$C\C/CH$_3$ | III | PF$_6$ |
| 47 | C$_2$H$_5$ | C$_2$H$_5$ | IV | H$_3$C\C/CH$_3$ | III | PF$_6$ |
| 48 | C$_2$H$_5$ | C$_2$H$_5$ | XVI | H$_3$C\C/CH$_3$ | VII | PF$_6$ |
| 49 | C$_3$H$_7$ | C$_3$H$_7$ | I | H$_3$C\C/CH$_3$ | I | PF$_6$ |

F I G. 13

NO. OF COMPOUND

| | R | R' | ··A·· | ···B··· | −①= | X |
|---|---|---|---|---|---|---|
| 50 | CH₃ | CH₃ | I | H₃C\C/CH₃ | II | Cℓ |
| 51 | CH₃ | CH₃ | IV | H₃C\C/CH₃ | II | Cℓ |
| 52 | CH₃ | CH₃ | V | H₃C\C/CH₃ | II | Cℓ |
| 53 | CH₃ | CH₃ | XII | H₃C\C/CH₃ | I | Cℓ |
| 54 | CH₃ | CH₃ | XVI | H₃C\C/CH₃ | I | Cℓ |
| 55 | C₂H₅ | C₂H₅ | I | H₃C\C/CH₃ | I | Cℓ |
| 56 | C₂H₅ | C₂H₅ | I | H₃C\C/CH₃ | III | Cℓ |
| 57 | C₂H₅ | C₂H₅ | IV | H₃C\C/CH₃ | III | Cℓ |
| 58 | C₂H₅ | C₂H₅ | XVI | H₃C\C/CH₃ | VII | Cℓ |
| 59 | C₃H₇ | C₃H₇ | I | H₃C\C/CH₃ | I | Cℓ |

FIG. 14

| NO. OF COMPOUND | R | R' | ..A.. | ...B... | -①= | X |
|---|---|---|---|---|---|---|
| 80 | CH₃ | CH₃ | I | H₃C\C/CH₃ | II | BF₄ |
| 81 | CH₃ | CH₃ | IV | H₃C\C/CH₃ | II | BF₄ |
| 82 | CH₃ | CH₃ | V | H₃C\C/CH₃ | II | BF₄ |
| 83 | CH₃ | CH₃ | XII | H₃C\C/CH₃ | I | BF₄ |
| 84 | CH₃ | CH₃ | XVI | H₃C\C/CH₃ | I | BF₄ |
| 85 | C₂H₅ | C₂H₅ | I | H₃C\C/CH₃ | I | BF₄ |
| 86 | C₂H₅ | C₂H₅ | I | H₃C\C/CH₃ | III | BF₄ |
| 87 | C₂H₅ | C₂H₅ | IV | H₃C\C/CH₃ | III | BF₄ |
| 88 | C₂H₅ | C₂H₅ | XVI | H₃C\C/CH₃ | VII | BF₄ |
| 89 | C₃H₇ | C₃H₇ | I | H₃C\C/CH₃ | I | BF₄ |

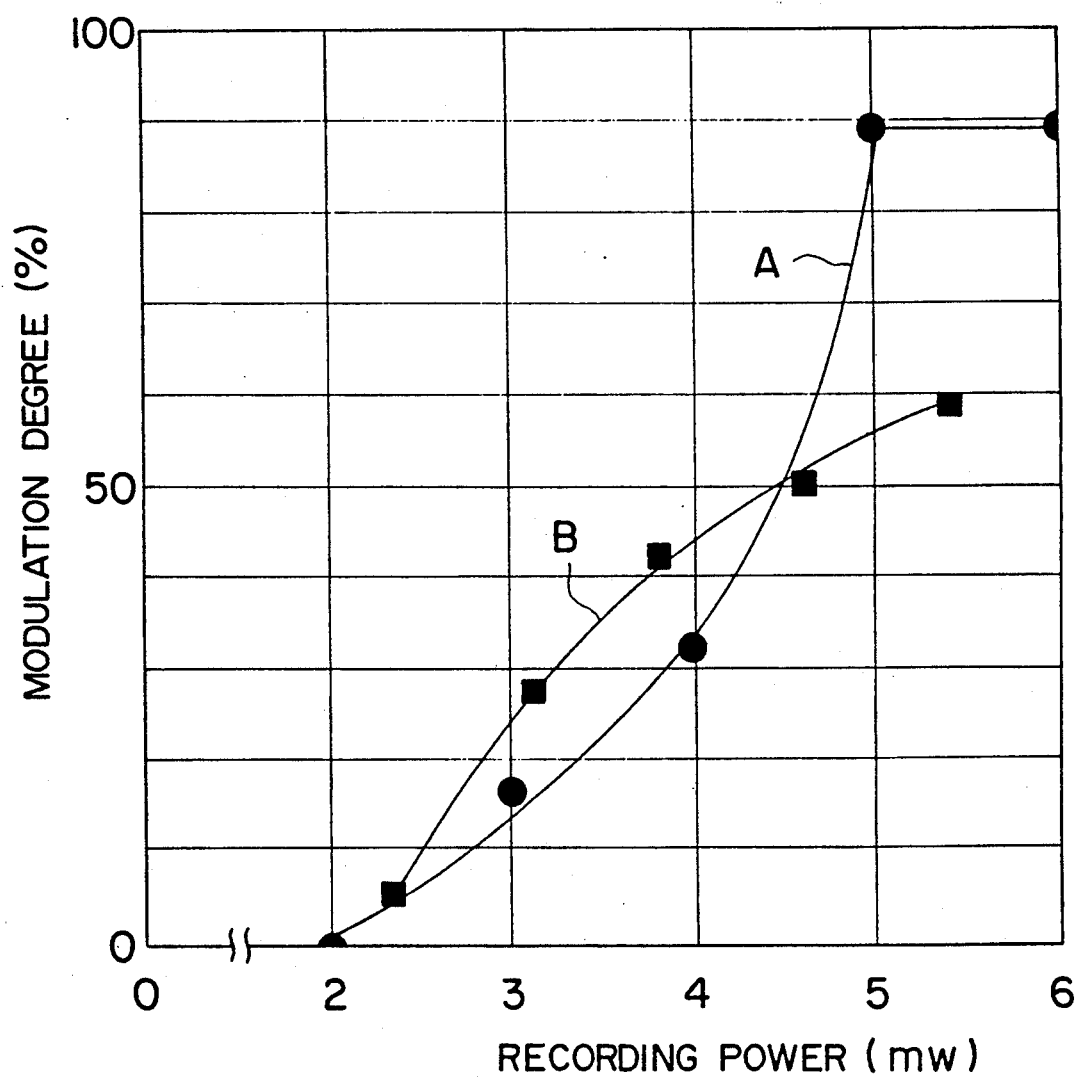
F I G. 18

F I G. 41
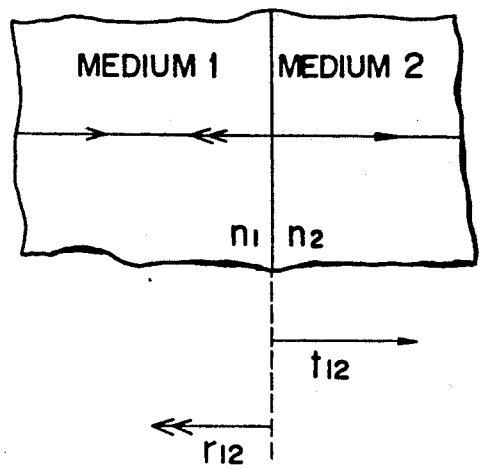
F I G. 42
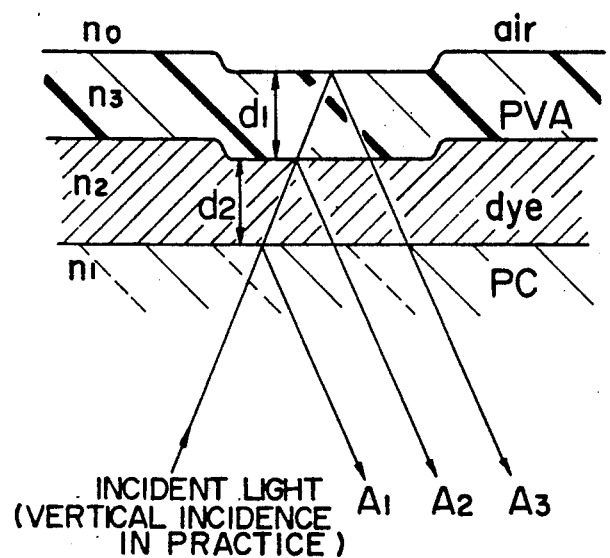
F I G. 43
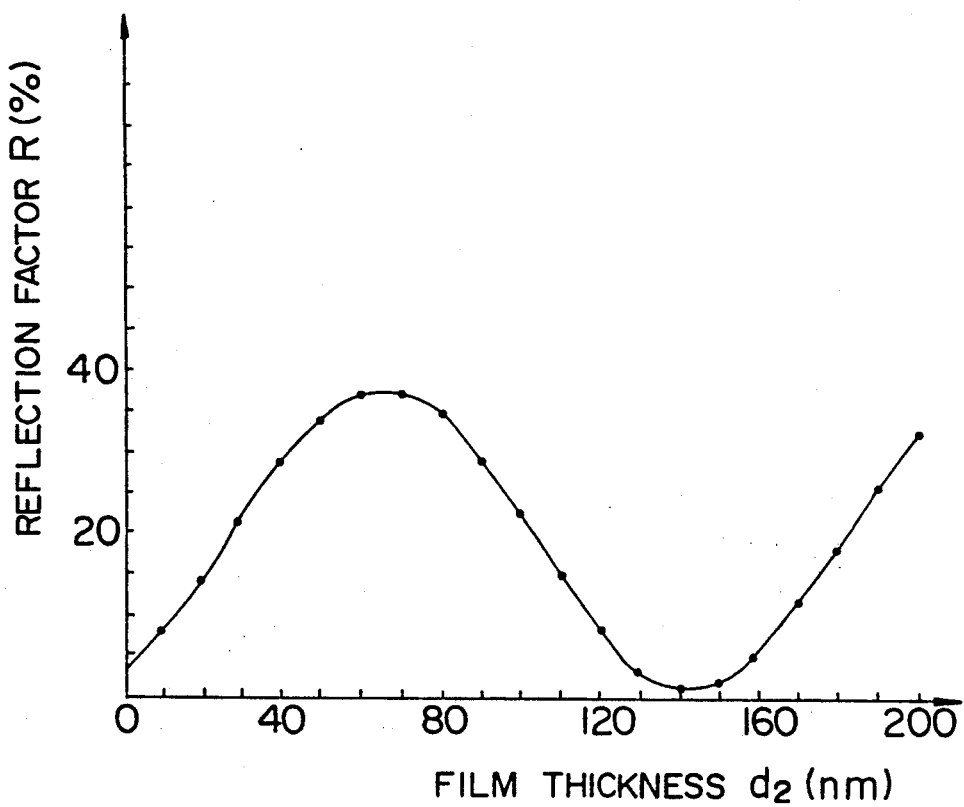

F I G. 46
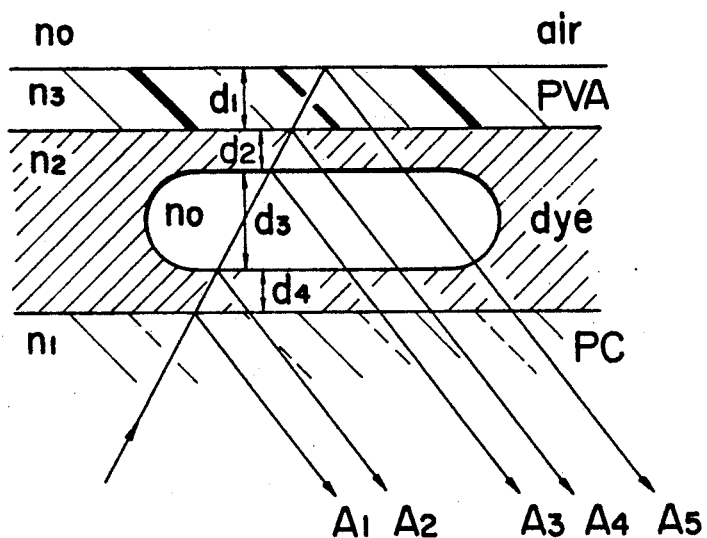
F I G. 47
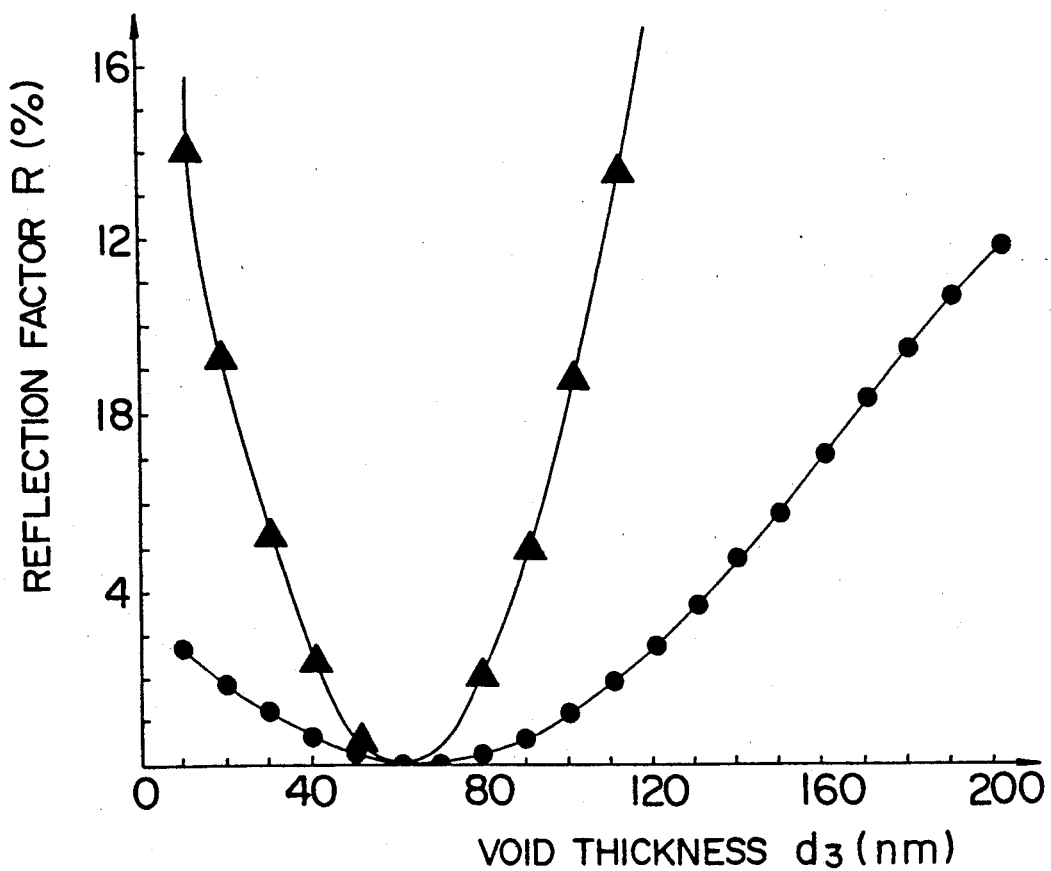

F I G. 48
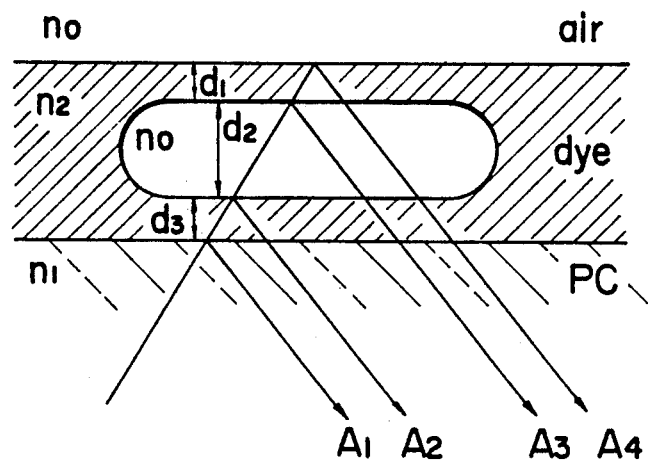
F I G. 49
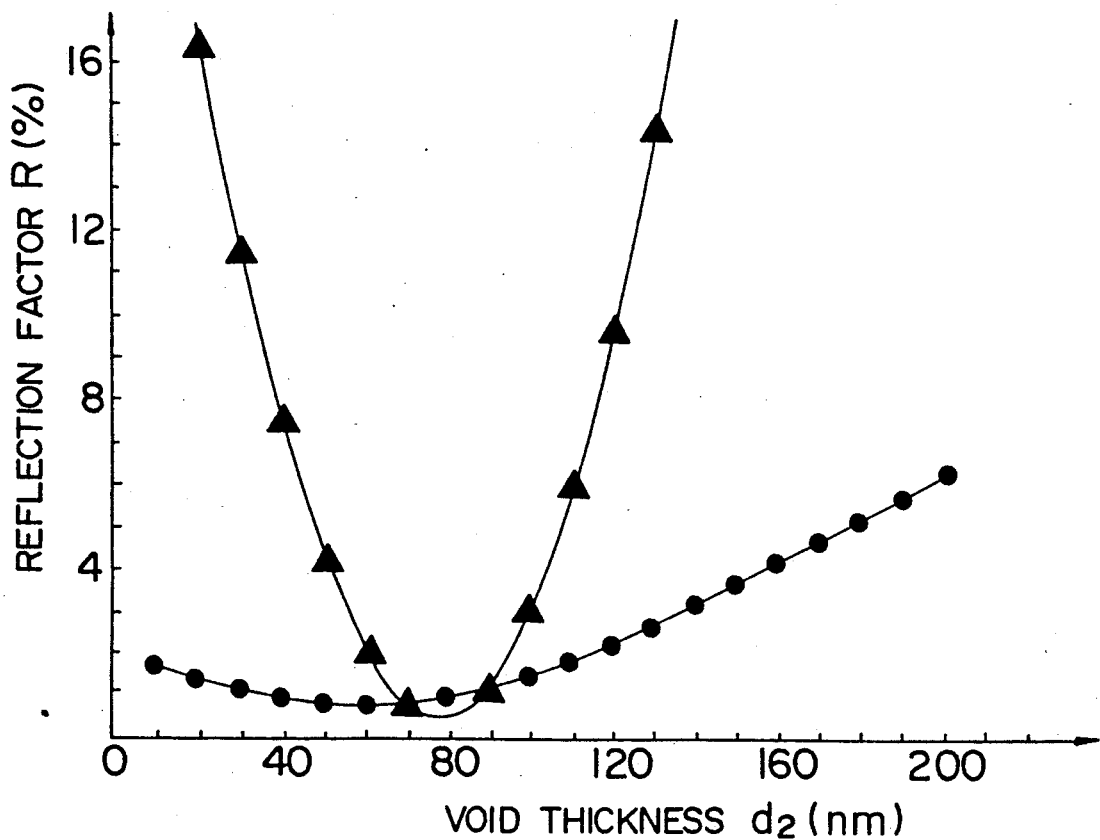

F I G. 50
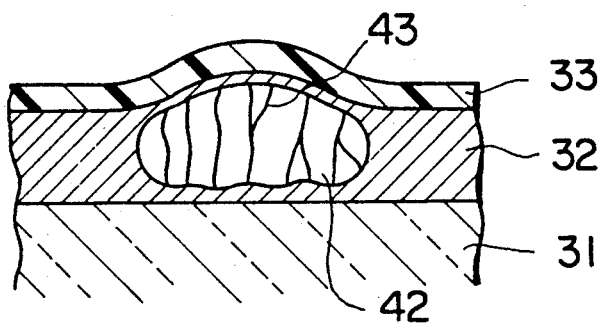
F I G. 51
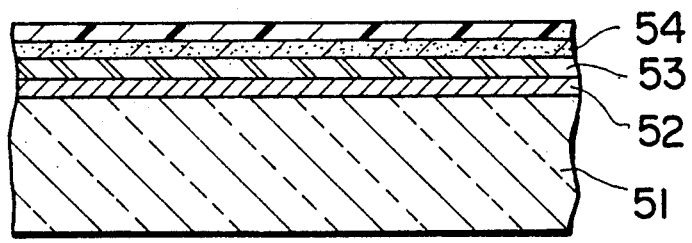
F I G. 52
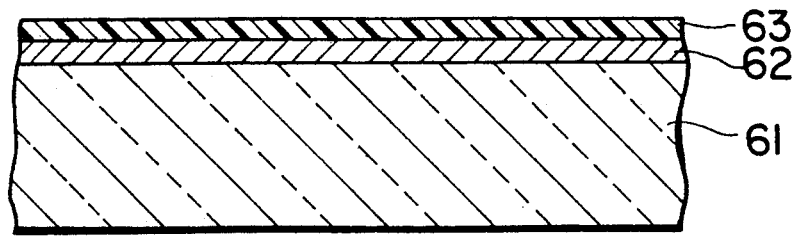

F I G. 53
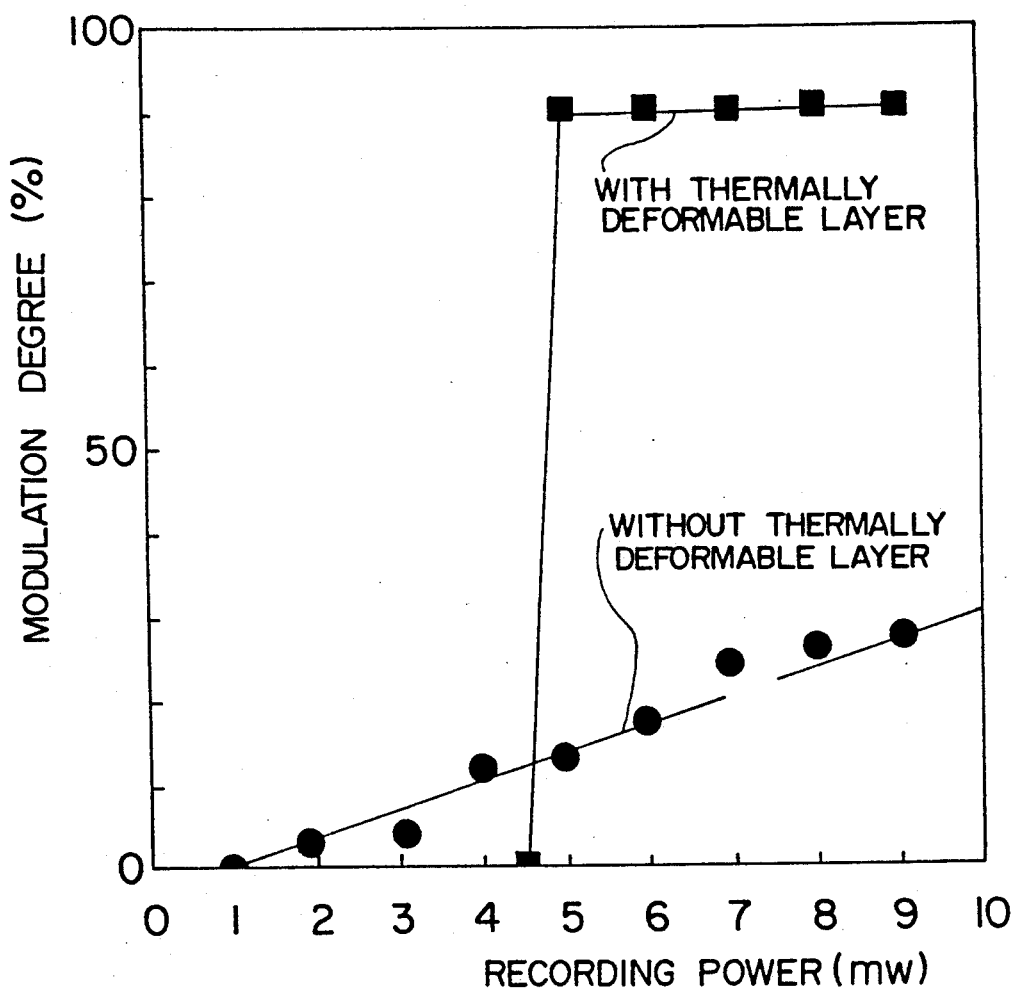

OPTICAL DATA RECORDING MEDIUM AND MANUFACTURING METHOD THEREOF

BACKGROUND OF THE INVENTION

1. Field of the Invention

The present invention relates to an optical data recording medium, such as an optical disk or the like and a manufacturing method for this medium, and more specifically, to an optical data recording medium suitably used in a WO (write once) type optical disk and the like provided, for example, with a recording layer composed of an organic dye type heat mode recording material and a manufacturing method for this medium.

2. Prior Art Discussion

At present, a CD (Compact Disk) for reproducing music has been widely used. Since, however, this CD is used for reproduction only and does not have a so-called DRAW (Direct Read After Write) function, a user cannot make a recording on such CDs or edit them. There is, thus, a strong desire for a CD having this DRAW function. Further, in an optical disk having applications other than a CD, a less expensive optical disk including the DRAW function is desired.

A metal material such as Te, for an abration type medium or a metal material, such as In, for a so-called phase changing type medium effecting dislocation from crystal to non-crystal is considered to be useful as a void type optical recording material having the DRAW function Since, however, a recording layer composed of these metal type recording materials is formed using a thin film formation technique such as a vapor-deposition method, a sputtering method or the like, there remains a problem in mass-productivity and cost.

Thus, a pit type (heat mode WO type) organic dye type recording material which can be formed into a film by a spin coating method is considered more viable with respect to productivity.

An optical disk, in particular, an optical disk using an organic dye as a recording material must be provided with a protective layer for protecting a recording layer, and this protective layer is preferably formed by a spin coating method in consideration of manufacturing costs, mass productivity and the like. Then, in general, a CD or the like is provided with a protective layer composed of an acrylate resin or the like formed by a spin coating method.

When, however, a UV curing type acrylate resin or the like, which is widely used and advantageous in material costs, productivity and characteristics, is coated on a recording layer composed of the above organic dye type recording material, there are possibilities that the recording layer will be damaged and, at worst, when a UV curing type resin is coated, the dye will melt and be completely removed.

In addition, it has been proposed to provide the kind of optical data recording medium which comprises a transparent substrate composed of a polymethyl methacrylate resin or glass having a thin film of a dye, such as squalilium, thiopyrylium or the like, formed thereon and pits formed on the thin film by irradiation of a laser beam. (D. J. Gravesteijn et al., SPIE 420. 327, 1983).

In addition to the above, there are many proposals for the material, such as a cyanine dye (Japanese Patent Kokai (Laid-Open) No. 58-125246, Japanese Patent Kokai No. 59-85791), a naphtoquinone dye (Japanese Patent Kokai No. 58-224793), an azulenium dye (Japanese Patent Kokai No. 59-129954), a naphthalocyanin dye (Japanese Patent Kokai No. 61-25886) and the like. Further, another proposal uses a single state oxygen quencher together with the cyanine dye to improve an optical stability (Japanese Patent Kokai No. 59-67092). All of these proposals intend to record data by defining pits on a recording layer composed of a single dye layer.

Further, there have been proposed a reflecting layer formed on a plastic film in a flattened layer, a recording layer composed of a mixture of dye and polymer are formed on the reflecting layer and recording pits are defined by irradiation of a laser beam (James W, Wheeler et al., SPIE 420. 39, 1983), that a recording layer composed a mixture of dye and styrene oligomer is formed (A. Kuroiwa et al., Jap. J. Appl. Phys. 22. 340, 983) and the like, and on all of which data are recorded by formation of pits.

When a recording layer is composed of a single dye of these various organic dyes, the dye remains on the bottom portions the pits defined by irradiation of a laser beam and the laser beam irradiated at the portion where the dye remains is reflected. Therefore, there is no difference between reflection factors at a flat portion and that at a pit portion, and thus a sufficient modulation factor cannot be obtained. Further, since the pits have a rim portion of the edges thereof shaped to a gentle and obscure configuration, this recording medium has a problem in that a signal output does not rise sharply.

Further, as described above, the recording medium provided with a recording layer composed of a mixture of the dye and polymer or the mixture of the dye and styrene oligomer has lower light absorption and light reflection than those of the recording layers composed of a single dye, and thus has a lower modulation factor. Further, not only this recording medium requires a larger power when a laser beam is irradiated thereon but also the configuration of the pits thereof is not clearly defined like the recording medium using the single dye so that the medium has a problem in recording reliability.

Further, with the above pit type optical recording medium, when a recording layer is formed on a transparent substrate and a laser beam is irradiated thereon, the recording layer is heat-melted at the portion where the beam strikes and the thickness of the recording layer made thinner or the substrate exposed at this portion.

In reproduction, a signal can be read out because a reflection factor of the portion is lowered. Since, however, the difference between the reflection factors at a non-recorded portion and that at a recorded portion is small, a sufficient modulation factor cannot be obtained and reproduction errors are caused.

In addition, there is also a known method that a metal film is expanded by vapor pressure produced by partially heating an organic film by the irradiation of a laser beam thereby to form bubbles for recording data.

Since, however, this method reproduces a signal by making use of reflection effected on a surface of a metal film and this metal film is formed by a thin film formation technique such as a vapor-deposition method, a sputtering method or the like, there remains a problem in mass-productivity and cost.

Conventionally, there exists a recording system wherein pits are defined by heat-melting and expanding a recording layer by irradiation of a laser beam. When a conventional dye and this irradiation are applied to a recording layer, declining of the viscosity according to the duration causes a restriction for good recording. As a means for solving this problem, there is an example wherein a material which is effectively subjected to a thermal effect by using a thermally unstable dye is employed. This thermally unstable material can improve sensitivity in recording, whereas it is degraded by reading light in reproduction. In addition, even if a thermally unstable material is used, a pit is only shaped to have an enlarged inner surface like a conical earthenware put and it is impossible to define good pits having clear pot edges.

Further, the dye is usually unstable under high light conditions, in particular under sunlight, and thus this recording medium has a drawback that the dye is observed to be degraded.

Thus low recording sensitivity and low resistance to light are problems of the prior art.

A process for manufacturing an optical recording medium comprising a heat-deformable optical recording layer and a protective layer of a transparent thermal and mechanical barrier layer are layered on the support thereof is disclosed in U.S. Pat. No. 4,340,655.

In this process, the protective layer is formed on the recording layer by applying a water solution of a water-soluble polymer to the recording layer to be dried.

However, the above prior art has the following problems:

(1) A water solution of the water-soluble polymer, in the case of production of an optical data recording medium by application of the solution to a recording layer to form a protective layer composed of a water soluble polymer, has the problems in that the recording material in the recording layer is dispersed or dissolved in water in the solution, or in that the material having wettability can not be used since the water of the solution permeates into the recording layer;

(2) Although a recording material difficult to dissolve in water is used, it is impossible to produce a medium composed of the recording layer and the protective layer, unless the recording material of the recording layer is wettable by the application solution;

(3) It is further necessary that a material having surface activity is used as a water soluble polymer component in the case that the recording material is water repellent.

SUMMARY OF THE INVENTION

Therefore, it is an object of the present invention to provide an optical data recording medium which is provided with a protective layer capable of being formed on a recording layer composed of an organic dye type recording material and the like by a spin coating method which can reduce costs of an optical disk and the like having the above DRAW function, and a manufacturing method of the medium.

A further object of the present invention is to overcome these drawbacks of the prior arts and to provide a highly reliable optical data recording medium.

Another object of the present invention is to provide an optical data recording medium having a high modulation factor capable of being produced at low cost, and a manufacturing method thereof.

Yet, another object of the present invention is to provide an optical data recording medium having a high recording sensitivity and resistance to high light condition.

To achieve the above first object, conditions of materials for forming layers of a recording layer and a protective layer and methods of forming these respective layers will be described below.

1) In a manufacturing method wherein a protective layer is formed by applying a coating solution by spinning it on a recording layer made in advance, recording material for the recording layer should be an organic dye or the like which is neither dissolved nor dispersed in the coating solution for coating the protective layer or in a solvent for the solution.

2) In a manufacturing method wherein a recording layer is formed on a substrate directly or through an underlayer by applying a coating solution by spinning and drying a coated film, and then a protective layer is formed on the recording layer by applying a coating solution for the protective layer by spinning and drying a coated film, the recording material should be neither soluble nor dispersable in water but soluble a non-water solvent, and a material for the protective layer should be soluble in water.

3) Alternatively, in case of the item 2), the recording material should be soluble in water and should be neither soluble nor dispersable a non-water solvent, and the material for the protective layer should not be soluble in water and should be soluble a non-water solvent.

4) In an optical data recording medium provided with a recording layer formed on a transparent substrate directly or through an underlayer, the above object is achieved by forming a thin layer composed of a hydrophilic polymer on the recording layer.

5) Further, the above first object of the present invention is achieved by a manufacturing method of an optical data recording medium wherein a recording layer is disposed on a transparent substrate directly or through an underlayer, a thin layer composed of hydrophilic polymer is formed on the recording layer as a protective layer by a spin coating method, and then the thin layer is subjected to water-proofing and a heat resistant treatment through cross-linking or crystallization.

In practical applications, any combination of the above manufacturing methods and component materials can achieve the above first object of the present invention.

Note that an example of component materials used in the item 2) may include an indol type cyanine dye having a methyne chain used as a recording layer and polyvinyl alcohol used as a protective layer, and as an example of item 3), anthocyanin or the like may be used as a recording layer and a UV curing resin may be used as a protective layer.

To achieve the above second object, an optical data recording medium according to the present invention is characterized in that it comprises at least a transparent substrate, a recording layer formed on the substrate and mainly composed of an organic dye, and "a thin layer as a protective layer" (referred to as "a thin layer", hereinafter) formed on the recording layer, and a portion of the recording layer irradiated by a laser beam has been moved from the substrate has been discharged from the contact place to the substrate.

Means of Solving the Problems—III

To achieve the above third object, an optical data recording medium according to the present invention including a transparent substrate and a recording layer formed on this substrate and having a refraction factor larger than that of the substrate is characterized by having voids for signals defined in the intermediate portion of the recording layer in the thickness direction thereof.

To achieve the above third object, an optical data recording medium according to the present invention is further characterized in that a recording layer is formed above a transparent substrate and a thin layer is formed on the recording layer for covering the same, and then voids are defined in the recording layer while the thin layer is substantially deformed to the opposite side of the substrate by heating the recording layer by a radiation beam irradiated from the substrate side or the side opposite to the substrate.

To achieve the above third object, in a method of manufacturing an optical data recording medium according to the present invention wherein a recording layer is formed on a transparent substrate and a thin layer is formed on the recording layer for covering the same, and then voids are defined in the recording layer while the thin layer is substantially deformed to the opposite side of the substrate by heating the recording layer by a radiation beam irradiated from the substrate side or the side opposite to the substrate, the method is characterized in that the above recording layer is composed of a material which is "neither easily dissolved nor easily dispersed in water" (referred to as "a difficult-to-dissolve-in-water property", hereinafter) and the above thin layer is composed of hydrophilic polymer, and the thin layer is subjected to a water-proofing treatment by a polymerization reaction.

To achieve the above fourth object, an optical data recording medium for at least recording data using a laser beam according to the present invention is characterized in that a recording layer is formed on a substrate through an underlayer or omitting the underlayer, the recording layer being capable of recording data through melting, expansion, decomposition, sublimation or the like. Almost sequentially the recording layer contains a cyanine dye which starts to melt at a temperature of 100° C. or more and within a laser beam power of 10 mW or less and an infrared ray absorbing agent of less than 20 wt % with respect to the cyanine dye which exhibits absorption in a wavelength region longer than that of the maximum absorption peak of the cyanine dye, and further a thermally deformable layer composed of a hydrophilic resin, subjected to a heat treatment, a radiation beam irradiation treatment or the like, is laminated on the recording layer.

To achieve the above fifth object, a material used as the component of the recording layer in this invention is an organic dye material which is difficult to disperse and dissolve in water, very difficult to react with water, and is poorly wettable by water.

A material used for the protective layer is a polymer, such as polyvinylalcohol, which is water soluble, shows surface activity to organic dye of the recording layer in a coated water solution in a protective layer, to be wettable by the organic dye the recording layer.

The thin layer of this invention composed of the above hydrophilic polymer can be formed by a spin coating method of high productivity without affecting the recording layer because the recording layer, composed of the organic dye type recording material, has a difficult-to-dissolve-in-water property. It is enough to be insoluble in water for a few seconds while spin coating is being effected to laminate the hydrophilic polymer, to be difficult-to-be-dissolved-in-water for the recording layer mentioned above. Hence it is acceptable that the recording layer has a slight water solubility. In addition, since this thin layer is hydrophilic and has low solubility to an organic solvent, a UV curing type resin, such as an acrylate resin and the like, can be formed on the thin layer as an overcoat layer without affecting the thin layer even if by a spin coating method, and this overcoat layer can also be formed by a spin coating method.

As described above, the arrangement whereby a portion of the recording layer to which a laser beam is irradiated is moved from the substrate, eliminates a dye remaining on the substrate and the beam is substantially not reflected so that the recording pits are clearly shaped and an output signal rises sharply.

As described above, according to the present invention, voids for signals are defined in the intermediate portion of the recording layer in the thickness direction thereof so that a modulation factor is increased by using an optical interference effect to be described in detail later thereby to provide highly reliable optical data recording medium.

Further, a method of manufacturing an optical data recording medium at a low cost with improved productivity can be provided by use of an organic dye compound as a material for the recording layer and the recording layer is formed by applying the compound to the transparent substrate by a spin coating method.

Decomposition, sublimation and heat-melting must be effected in a low temperature range to form clear pits by an irradiation of a laser beam on the recording layer. Thus, a dye which is thermally unstable at a temperature of 230° C. or less is preferably used, while when a dye which is thermally unstable at a temperature of 230° C. or higher is used, the recording layer of high sensitivity cannot be obtained. The lower limit of the thermal instability is 100° C., which corresponds to a maximum temperature in a compartment of an automobile parking under the blazing sun in the summer, and thus this temperature must be the lower limit temperature. On the other hand, the upper limit of 230° C. is a temperature preferable to satisfy the recording conditions such as a light power of 10 mW or less, a linear velocity of 6 m/sec. or more and a light pulsewidth of about 100 n sec., and the light power exceeding 10 mW is inconvenient because of the increase in power consumption and also from the view point of the durability of a laser beam and cost.

Further, a lower linear velocity results in inconvenience in a transfer speed and the like. The light pulsewidth is related to the linear velocity, and a broader pulsewidth encountered with a higher linear velocity results in a lowered recording capacity. Therefore, the light pulsewidth is preferably about 100 n sec., although it has a relation to the linear velocity.

In a order to form pits effectively in short time, a melting dye must not be expanded two-dimensionally but must be expanded three-dimensionally. For this purpose, a hydrophilic polymer is cross-linked on the recording layer or a thermally deformable layer subjected to a heat treatment is formed thereon so that it receives heat from the recording layer when a laser beam is irradiated thereon and protrudes toward the opposite side with respect to the substrate thereby to expand the dye three-dimensionally. At this time, the pressure in the thermally deformable layer is increased simultaneously by the dissolution and sublimation of the dye and the formation of pits is accelerated by the increase in pressure. In addition, a material used as the thermally deformable layer must be water-proof and moisture resistant.

Since a cyanine dye or the like used is generally insoluble in water, the hydrophilic polymer used as a material of the thermally deformable layer does not damage the recording layer in lamination. Since, however, the thermally deformable layer is hydrophilic, it absorbs water from the air to be deformed and swelled. Therefore, the water-proof and moisture resistance of the thermally deformable layer is improved by a cross-link treatment by the addition of a cross-linking agent, a heat treatment, a radiation treatment or the like.

The improvement of durability of the recording layer under the reading light beam radiation will be described below.

The deterioration of the recording layer by a reproducing light beam includes a deterioration caused by the heat of a laser beam and deterioration caused by light. The thermal deterioration is restricted by providing a thermally deformable layer and transferring heat therethrough to it to reduce an accumulation of heat. The deterioration caused by light can be restricted by adding to the cyanine dye an infrared absorption agent which exhibits absorption in a wavelength region longer than that in the maximum absorption peak of the cyanine dye, the cyanine dye being changed to a stable energy state. When, however, an infrared absorbing agent of 20 wt % or more is contained in the cyanine dye, the stability of the cyanine dye adversely affects recording sensitivity, and sensitivity is lowered.

FIG. 8 is a diagram illustrative of typical examples of A and A' used in the general formula, likewise;

FIG. 9 through FIG. 14 are diagrams illustrative of examples of organic dyes used in the embodiments;

FIG. 18 is a characteristic diagram illustrative of a modification degree in the recording layers of the present invention and in that of a prior art;

FIG. 41 is a diagram explanatory of an energy reflection factor R;

FIG. 42 is a diagram explanatory of composite light composed of light reflected at respective interfaces of an optical data recording medium composed of a substrate with a recording layer and a thin layer sequentially formed thereof;

FIG. 43 is a characteristic diagram illustrative of a change of an energy reflection factor when a film thickness of a recording layer of the optical data recording medium, shown in FIG. 42, is changed;

FIG. 46 is a diagram explanatory of composite light composed of light reflected at respective interfaces of an optical data recording medium composed of a substrate having a recording layer and a thin layer sequentially formed thereon and a void defined at the intermediate portion of the recording layer;

FIG. 47 is a characteristic diagram illustrative of a change of an energy reflection factor R obtained when film thicknesses $d_2$ and $d_4$ are fixed and a void thickness $d_3$ is sequentially changed in the optical data recording medium shown in FIG. 46;

FIG. 48 is a diagram explanatory of composite light composed of light reflected at respective interfaces of an optical data recording medium composed of a substrate having only a recording layer formed thereon and a void defined at the intermediate portion of the recording layer;

FIG. 49 is a characteristic diagram illustrative of a change of an energy reflection factor R obtained when film thicknesses $d_1$ and $d_3$ in a recording layer are fixed and void thickness $d_2$ is sequentially changed in the optical data recording medium shown in FIG. 48;

FIG. 50 is an enlarged cross sectional view of another schematic example of a recording pit of a fifteenth embodiment according to the present invention;

FIG. 51 is an enlarged cross sectional view of a main part of an optical disk illustrative of a sixteenth embodiment using micro capsules according to the present invention;

FIG. 52 is an enlarged cross sectional view of a main part of an optical disk of a seventeenth embodiment according to the present invention; and FIG. 53 is a characteristic diagram illustrative of a modification degree of cases with and without a thermally deformable layer.

DETAILED DISCUSSION

Figure 1:
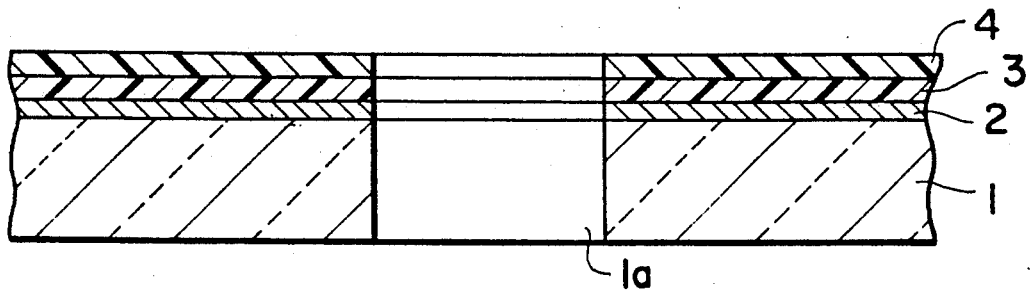
FIG. 1 is an enlarged cross sectional view of a main part of an optical disk of the first embodiment according to the present invention.

The present invention will be described below in detail with reference to the embodiments illustrated in the drawings.

First Embodiment

FIG. 1 is a schematic partial and cross sectional view of an optical disk of the first embodiment, composed of a disk-shaped substrate 1, which may be composed of a transparent material such as a transparent resin, as polycarbonate, polymethyl methacrylate, polymethyl penten, epoxy resin and the like or transparent ceramics such as glass and the like, in this embodiment a polycarbonate substrate, with a center through hole of the substrate 1.

A recording layer is formed on the substrate 1 by a spin coating method composed of an organic dye type heat mode recording material difficult-to-dissolve-in-water. This organic dye type heat mode recording material may be composed, for example, of a polymethyne dye, an anthraquinone dye, a cyanine dye, a phthalocyanine dye, a xanthene dye, a tri-phenyl methane dye, a pyrilium dye, an azulene dye, a metal containing azo dye and the like. This embodiment uses a cyanine dye type material, and a methanol solution containing the cyanine dye is applied to the substrate 1 by a spin coating method to form the recording layer 2. The above difficult-to-dissolve-in-water property of this recording layer 2 means that it is not dissolved in water for a few seconds while spin coating of a thin layer 3 composed of a hydrophilic polymer described later, is being effected and the recording layer 2 may be slightly dissolved in water.

The thin layer 3 composed of the hydrophilic polymer and formed on the recording layer 2 by a spin coating method, may be composed of the following water-soluble resins.
1. polyvinyl alcohol
2. polyethylene oxide
3. polyacrylic acid
4. polystyrene-sodium-sulfonic acid
5. polyvinyl pyrolydone
6. polymethacrylic acid
7. polypropylene glycol
8. methyl cellulose
9. polyvinyl nitrate This embodiment uses the polyvinyl alcohol (PVA) as the thin layer 3, and a water solution containing the PVA is applied by a spin coating method to form the thin layer 3 having a film thickness of 120 nm.

Note that the thin layer 3 must have a film thickness of 60 nm (0.06 $\mu$m) or more, and when the thickness is less than 60 nm, pin holes are created and thus water and foreign matter penetrates through these pin holes and is deposited on the recording layer 2 and causes errors. In addition, when an overcoat layer 4 is additionally formed on the thin layer 3, an overcoat material penetrates through these pin holes and attacks the recording layer 2. Therefore, the thin layer 3 preferably has a thickness of 60 nm or more. On the other hand, the thin layer 3 may have any upper limit thickness. When, however, the thin layer 3 is applied to an optical disk used for a CD, the thickness of the thin layer 3 is limited to 400 $\mu$m or less because the CD standard specifies the thickness of a substrate to 1.2±0.1 mm and the total thickness of the disk to be from 1.2 to 0.3 to 1.2−0.1 mm at present. The thickness of the thin layer may be of course 400 $\mu$m or more, when it is used for applications other than a CD. The film thickness of the thin layer 3 can be arbitrarily adjusted by the selection of a rotational mode of the substrate 1, a dropping condition, concentration, the atmosphere around a turn table and the like when the spin coating of the PVA is effected.

Incidentally, since the thin layer 3 is composed of the water-soluble polymer such as the PVA and the like, its moisture resistance is lowered. Hence, the thin layer 3 is subjected to a cross-linking treatment or the like to provide it with a water resistant property (moisture resistance) and a heat resistance. More specifically, a cross-linking agent or the like is added into the water solution of the water soluble polymer and, after the thin layer 3 is formed, a cross-linking reaction is effected by an irradiation of light or a cross-linking reaction is effected by heating. Alternatively, the thin layer 3 with no addition of the cross-linking agent is heated and crystallized (for example, since the PVA is used in this embodiment, the PVA is denaturated) or subjected to other treatments so that it is made insoluble to water, water-resistant and heat resistant.

Since, however, the above cross-linking reaction effected by a light irradiation which does not require the consideration of an adverse thermal affect to the substrate 1 and the recording layer 2 and is also excellent in operating performance, this embodiment employs a technique wherein chrome is added as a cross-linking agent and the cross-linking reaction is effected in the thin layer 3 by the irradiation of light.

Examples of a cross-linking means are shown as follows and any conventional means can be employed as necessary.
1. A addition, for example, of copper, boron, aluminum, titanium, zirconium, tin, vanadium, chrome and the like as an inorganic cross-linking agent
2. acetal formation with aldehydes
3. aldehyde formation of hydroxyl group
4. addition of activated vinyl compound
5. etherification with epoxide compound
6. reaction of dicarboxylic acid with acid catalyst
7. addition of succinic acid and sulfuric acid
8. addition of triethylene glycol and methyl acrylate acid
9. blending of polyacrylic acid and methyl vinyl ether-maleic acid copolymer The overcoat layer 4 is formed on the thin layer 3 by a spin coating method, and in this embodiment, an acrylate resin as a UV curing type resin is used and its film thickness is selected to be 100 $\mu$m. Note that the overcoat 4 may be composed of a suitable material other than the acrylate resin.

In this embodiment, after the thin layer 3 and the overcoat layer 4 are formed in sequence, both the layers are irradiated by ultraviolet rays, the thin layer 3 being cross-linked and the overcoat layer 4 being polymerized to be provided with water and heat resistance.

When data was recorded on an optical disk manufactured as described above with a linear velocity of 1.25 m/sec. and a recording power of 5 mW and the data reproduced with a reproducing power of 0.5 mW, a good recording/reproducing property was obtained. No increase in noise or the like due to the existence of the thin layer 3 as an intermediate layer disposed under the overcoat layer 4 was observed.

Further, it was confirmed that the heat-melted material of the recording layer was easily shed by the thin layer 3 and good pits were defined when a heat mode recording was carried out (when holes were defined in the recording layer 2) because the thin layer 3 is hydrophilic. Note that a recorded pit array had a length of 0.9–3.3 μm and intervals of 0.9–3.3 μm.

Using the same polycarbonate substrate as that shown in the first embodiment, a spin coating was effected on the substrate to form a recording layer of 80 nm thick using a methyl alcohol solution as cyanine dye containing 1.5 wt % of 1-methyl-2-[7-(1-methyl 2-indolinydene) 1,3,5-heptatrienyl] 3,3-dibutyl-indolium-hexafluorophosphate.

Separately from this operation, a 10% water solution containing a mixture of polyvinyl alcohol having a degree of saponification of 88.0% and a degree of polymerization of 1700 and bichromate ammonium of 10% with respect to the polyvinyl alcohol was prepared. This solution was applied to the recording layer by a spin coating to form a thin layer of 60 nm thick. After this thin layer was dried, ultraviolet rays were irradiated thereon for 30 sec. from a position 15 cm apart therefrom at a power of 2.4 KW to form an air sandwich type optical disk using an organic dye by cross-linking the above polyvinyl alcohol.

Likewise, as an example for comparison, a water solution containing 15% of sodium 2-acrylamide-2-methyl-propane-sulfonate polymer, described in Japanese Patent Kokoku No. 1-14879 was prepared and applied to a dye recording layer to a thickness of 60 nm to form an air sandwich type optical disk.

Recording properties were measured using a semiconductor laser having an oscillating wavelength of 830 nm and an objective lens having an NA (numerical aperture) of 0.53. The above optical disk was rotated at 1800 rpm and data was recorded with a pulsewidth of 100 ns and a recording power of 7 mW. As a result, a modulation degree of 49 was obtained for the optical disk using the sodium-2-acrylamide-2-methylpropane-sulfonate polymer, whereas the modulation degree for the optical disk provided with the thin layer of polyvinyl alcohol formed on the recording layer of cyanine dye was 80%.

When a recording layer composed of cyanine dye is used in the recording carried out at with a wavelength of 780–830 nm using a light source of a semiconductor laser, cross-linked polyvinyl alcohol having a softening point of 200° C. or more is most preferably used as a thin layer material. The cross-linked polyvinyl alcohol has a softening point of 200–230° C. When, however, a material having a softening point of 200° C. or less, an optical recording with a good C/N (carrier/noise) cannot be obtained.

More specifically, since the cyanine dye used as a recording material in the present invention has a melting point or the decomposing temperature of 200–230° C., when a recording layer reaches this temperature by an irradiation of a laser beam, the dye layer is liquefied and vaporized to cause a thin layer where the laser beam is irradiated to be swelled, whereby a high C/N is obtained, and when the thin layer is formed by a material having a softening point of 200° C. or more, the most preferable recording can be carried out.

When, however, the thin layer is formed by a material having a softening point of 200° C. or less, such as a sodium-2-acrylamide-2-methylpropane-sulfonate polymer, as described in Japanese Patent Kokoku No. 1-14879, a portion where the laser beam is irradiated melts even the thin layer together with the dye layer and defines holes, such that the preferable swelling is not formed and the high C/N cannot be obtained, which is greatly different from the result of the present invention.

According to the present invention, a dye material for a recording layer is strictly designed and further a material for a thin layer formed thereon is examined in detail to ensure that a portion of the recording layer where a laser beam is irradiated forms a preferable swelling to provide a high C/N, in a recording carried out by a semiconductor laser beam. As a result, polyvinyl alcohol is determined to be the most preferable material, and after a thin film is formed on the dye, the film is cross-linked and subjected to a water resistance treatment to form the recording layer.

Second Embodiment

Figure 2:
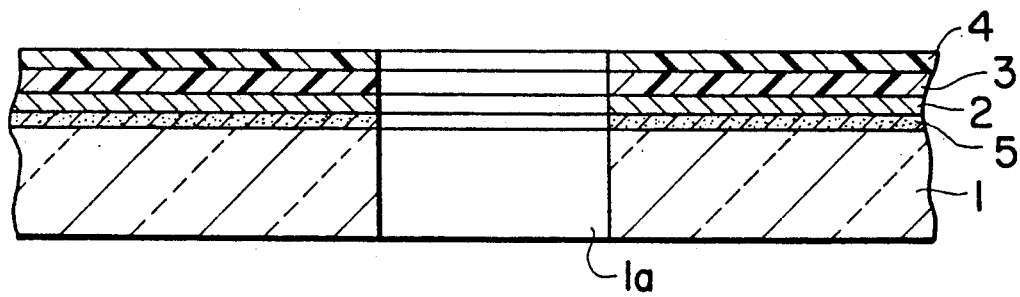
FIG. 2 is an enlarged cross sectional view of a main part of an optical disk of the second embodiment according to the present invention.

FIG. 2 shows a second embodiment of the present invention, wherein an underlayer 5, for the purpose of increasing sensitivity, is disposed on a substrate 1.

While autoxidation compounds and the like are used as a material of the underlayer 5, this embodiment uses polyvinyl nitrate as one of the autoxidation compounds, and a water solution containing the polyvinyl nitrate is formed into the underlayer 5 by a spin coating method. A recording layer 2, which is formed by applying a solution obtained by dissolving a cyanine dye in 1,2-dichloroethane by a spin coating method, is disposed on the underlayer 5. Note that a thin layer 3 and an overcoat layer 4 are the same as those in the above first embodiment.

When data was recorded to an optical disk of this second embodiment with a linear velocity of 1.25 m/sec and a recording power of 3 mW and the data was reproduced with a reproducing power of 0.5 mW, the same recording/reproducing property as that of the first embodiment was obtained.

Third and Fourth Embodiments

Figure 3:
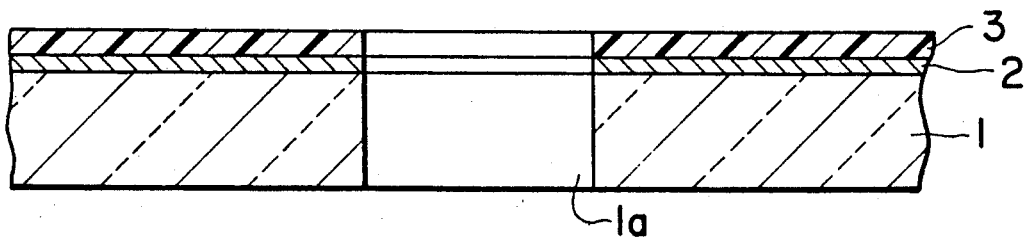
FIG. 3 is an enlarged cross sectional view of a main part of an optical disk of the third embodiment according to the present invention.
Figure 4:
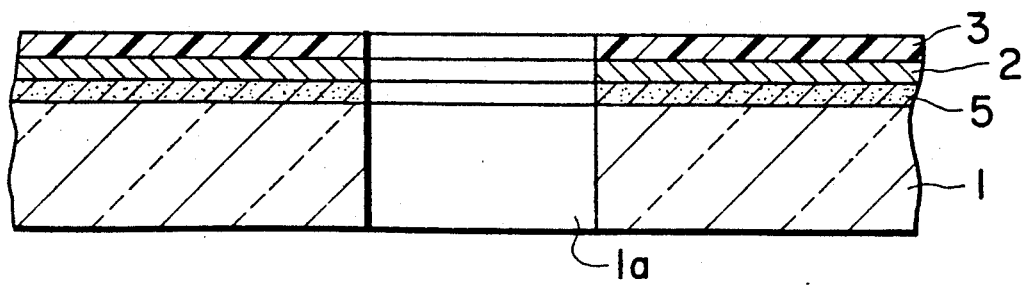
FIG. 4 is an enlarged cross sectional view of a main part of an optical disk of the fourth embodiment according to the present invention.

FIGS. 3 and 4 show a third embodiment and a fourth embodiment of the present invention, respectively. These third and fourth embodiments are arranged to omit the above overcoat layer 4. The third embodiment is a case with no underlayer 5 and the fourth embodiment is a case including the underlayer 5. In these third and fourth embodiments, a thin layer 3 has a thickness of from tens to hundreds μm and is made water resistant and heat resistant by a cross-linking reaction. In these embodiments, a good recording/reproducing property is expected, likewise.

The respective embodiments described above can be formed with the thin layer 3 on the recording layer 2, by a spin coating method, without the possibility of attack on the recording layer 2 composed of the organic dye type heat mode recording material and which also formed by a spin coating method.

Note that in the above embodiments, while the recording layer 2 is composed of the organic dye type recording material, the hydrophilic polymer of the present invention is applicable as a thin layer to be formed on a recording layer having various recording modes.

This hydrophilic polymer can be applicable to a laser disk, various kinds of write once type or reproducing-/recording type (erasing type) optical disks and the like in addition to a CD, and in some cases, also applicable to an optical data recording medium other than the optical disk so that the present invention is not limited by a recording area mode or a recording speed control system.

Fifth Embodiment

Figure 5:
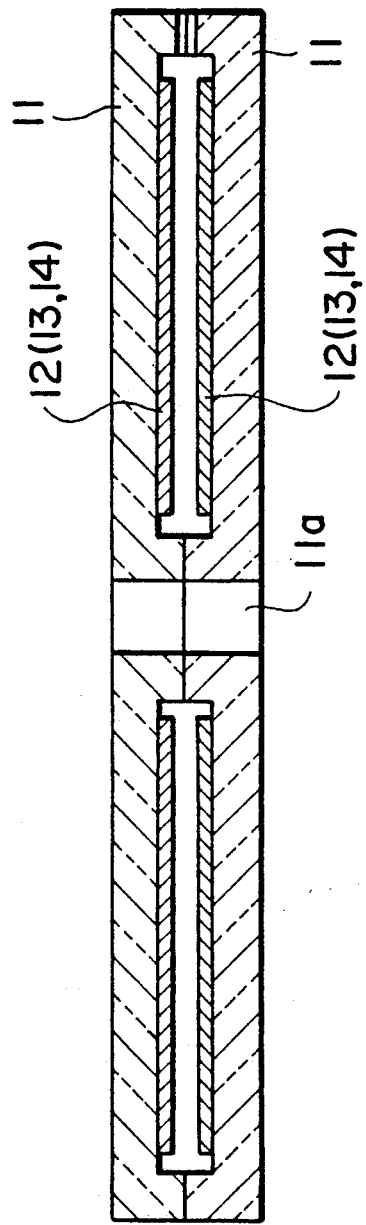
FIG. 5 is a vertical cross sectional view of an air sandwich type optical disk of the fifth embodiment according to the present invention.
Figure 6:
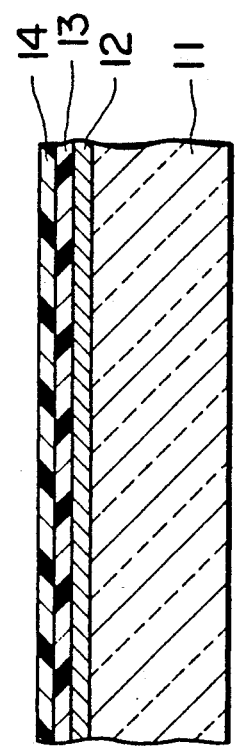
FIG. 6 is an enlarged cross sectional view of main part of the optical disk.

FIG. 5 is a vertical cross sectional view of an air sandwich type optical disk of a fifth embodiment of the present invention, and FIG. 6 is an enlarged cross sectional view of a main part of this optical disk.

In FIGS. 5 and 6, a disk-shaped substrate 11 is composed of a transparent material, which may be composed of a transparent resin material, such as polycarbonate, polymethyl methacrylate, polymethyl pentene, epoxy resin and the like, or transparent ceramics, such as glass and the like. In this embodiment, a polycarbonate substrate is used center through hole 11a is provided in of the substrate 11.

Recording layer 12 is formed on the substrate 11 by a spin coating method and is composed of an organic dye type heat mode recording material difficult-to-dissolve-in-water. This organic dye type heat mode recording material may be composed of, for example, a polymethyne dye, an anthraquinone dye, a cyanine dye, phthalocyanine dye, a xanthene dye, a triphenyl methane dye, a pyrylium dye, an azulene dye, a metals containing azo dye and the like. This embodiment uses a cyanine dye type material, and a methanol solution containing the cyanine dye is applied to the substrate 11 by a spin coating method to form the recording layer 12.

An indol type cyanine dye of cyanine type organic dyes which particularly has the following general formula is preferably used.

General Formula

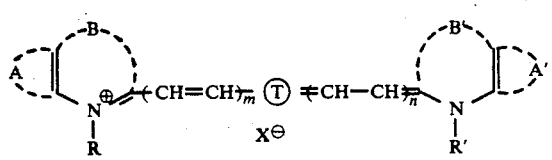

In the formula, (T) is a carbon chain to form a methyne chain and is composed a linear chain or polycyclic compound of $C_3-C_{17}$. A hydrogen atom attached to a carbon atom and may be substrated by a halogen atom,

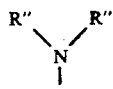

(R" is a linear chain of $C_1-C_6$ or an aromatic ring);

A may be equal to or different from A' and both of them represent an aromatic ring, respectively. A hydrogen atom attached to a carbon atom may be substrated by —I, —Br, —Cl, —$C_nH_{2n+1}$(n=1-22), —OCH$_3$,

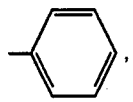

—NO$_2$, and

(R'''is a linear chain of a hydrocarbon or an aromatic ring);

B may be equal to or different from B' and both of them represent —O—, —S—, —Se—, —CH=CH—, or

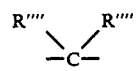

(R'''' is an alkyl group of $C_1-C_4$ such as CH$_3$, C$_2$H$_5$, C$_3$H$_7$, C$_4$H$_9$);

R and may be equal to or different from R', both of them represent an alkyl group of $C_1-C_{22}$ and may be substrated by a sulfonyl group or a carboxyl group;

X$^\ominus$ represents an anion containing a phosphor element, for example, hexafluoro-phosphate ion$_6^\ominus$or the like or an anion such as I$^\ominus$, ClO$_4^\ominus$, Cl$^\ominus$, or BF$_4^\ominus$; and m and n represent 0 or integer of 1 through 3, respectively, and have a relationship of m+n≦3.

The recording layer 12 can be formed on the disk substrate 11 through an underlayer or omitting the underlayer, by any method including a solution spin coating method, a vapor-deposition method or a laminating method by Langmuir-Blodgett or a suitable combination of these methods.

Figure 7:
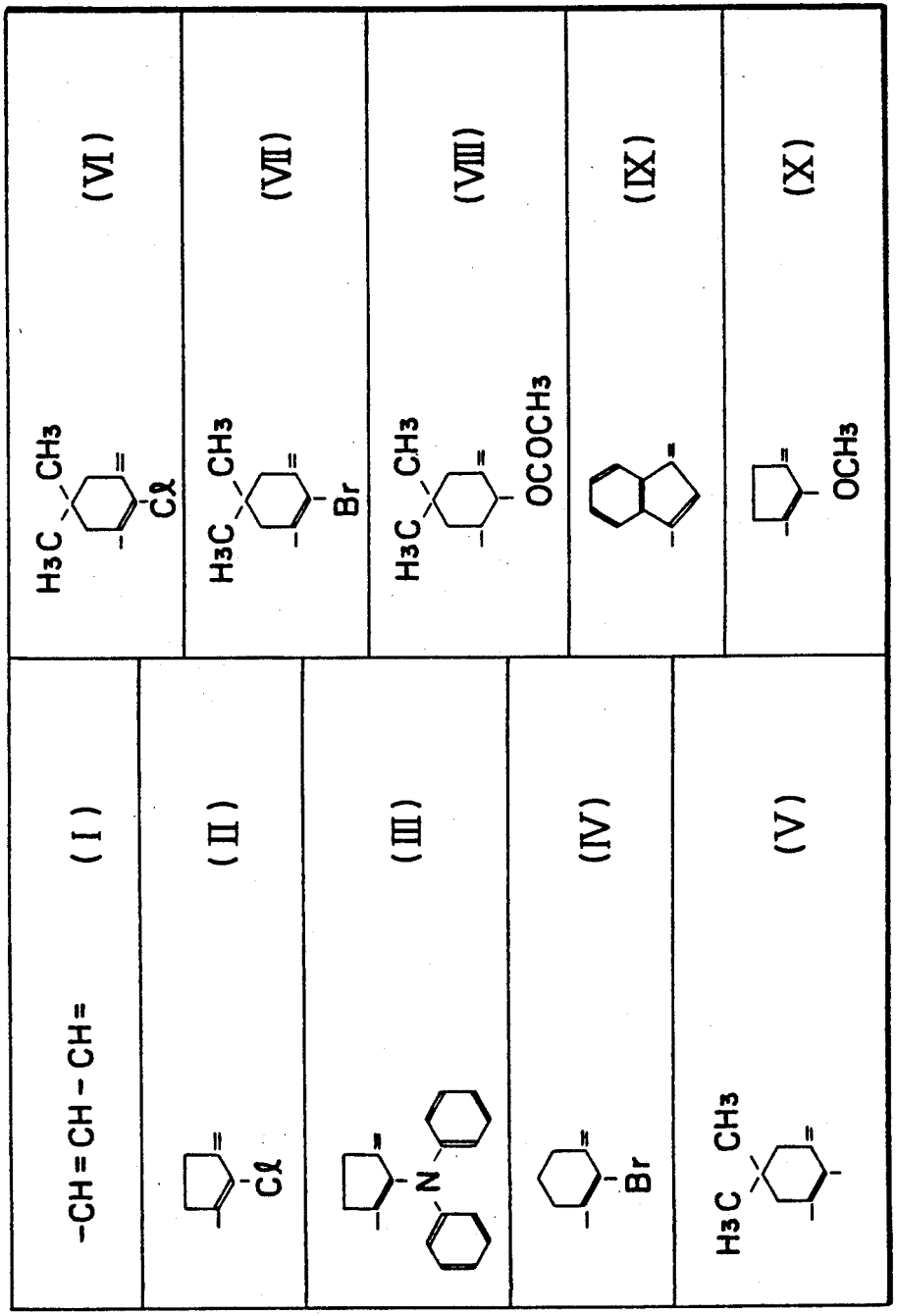
FIG. 7 is a diagram illustrative of typical examples of $(T)$ in the general formula of organic dyes used in the embodiments.

While FIG. 7 shows typical examples of (T) in the general formula, material having any formula other than these examples representing (T) as defined above may be used.

In addition, while FIG. 8 shows typical examples of A and A' in the general formula, material having any formula other than these examples representing A and A' as defined above may be used.

1 wt % of each of various organic dyes shown in FIG. 9 through FIG. 14 was dissolved in 1,2-dichloroethane and this solution was applied to a disk substrate composed of polymethyl methacrylate by a spinner method to form a recording layer and an optical disk was fabricated by a usual method.

Various experiments prove that when (T)in the above general formula shown in FIG. 9 through FIG. 14 is —CH=CH—CH= or

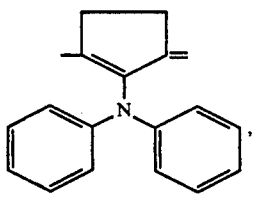

the heat resistance and recording sensitivity of the recording layer can be improved.

In addition, when A and A' in the above general formula is

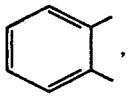

the reflection factor of the recording layer can be improved.

Further, when B and B' in the above general formula is

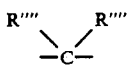

(R'''' is an alkyl group of $C_1$-$C_4$), the solubility of the organic dye can be increased.

Furthermore, when R and R' in the above general formula is $C_4H_9$ or $C_5H_{11}$, the reflection factor of the recording layer can be increased.

In particular, the cyanine dye, wherein (T) in the general formula is

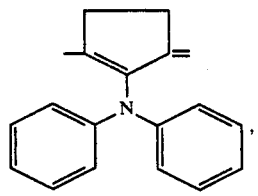

A and A' are

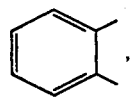

B and B'

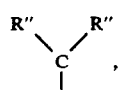

Figure 15:
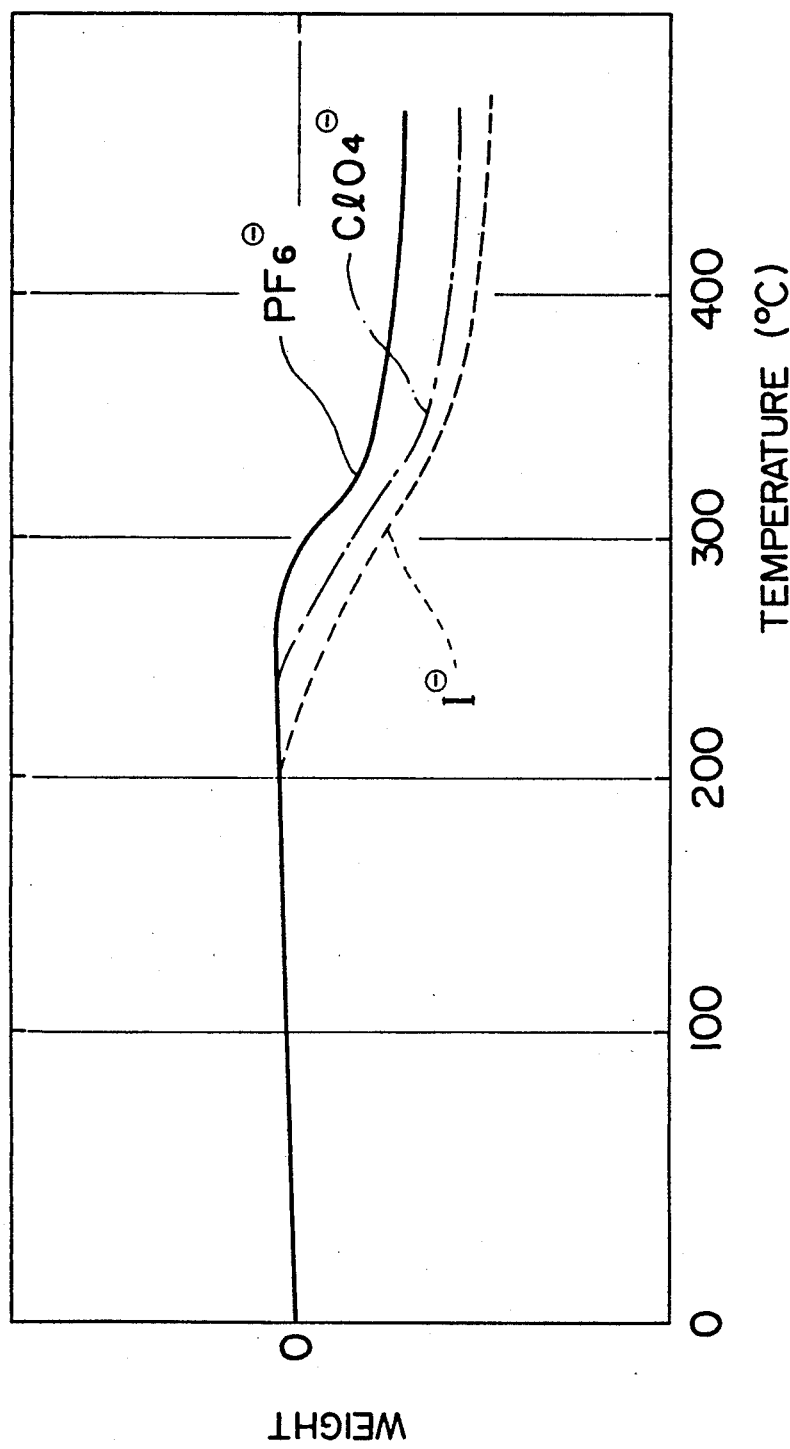
FIG. 15 is a characteristic diagram illustrative of a result of a thermogravimetric analysis of organic dyes.

R and R' are $C_2H_5$, and X is $PF_6$ or I, has an excellent heat resistance, recording sensitivity, reflection factor and solubility, and can be advantageously used. Next, an indol type cyanine dye which was composed of 1-ethyl-2-[7-(1-ethyl-3,3-dimethyl -2-indolinydene)-1,3,5-heptatriethyl]-3,3-dimethyl-indolium and in which iodine ion $I^\ominus$, perchloric acid ion $ClO_4^\ominus$ and hexafluoro-phosphate ion $PF_6^\ominus$ were arranged, respectively, as anions was synthesized. These various kinds of organic dyes were subjected to a thermogravimetric analysis. The result of the analysis is shown in FIG. 15, wherein a change of weight of the dyes using $I^\ominus$ is shown by a dotted line, a change of weight of the dyes using $ClO_4^\ominus$ is shown by a dot-dash-line and a change of weight of the dyes using $PF_6^\ominus$ is shown by a solid line, respectively.

Note that a differential scanning colorimeter Model TAS-100 of Rigaku Denki Co., Ltd. was used as a measuring instrument, and samples were heated in nitrogen gas having a flow rate of 100 ml/min. with a temperature increase rate of 20° C./min., and temperatures at which the weight of the samples began to decrease were measured.

Next, the conditions under which the recording layer and the like are formed by a spin coating method will be described.

Figure 16:
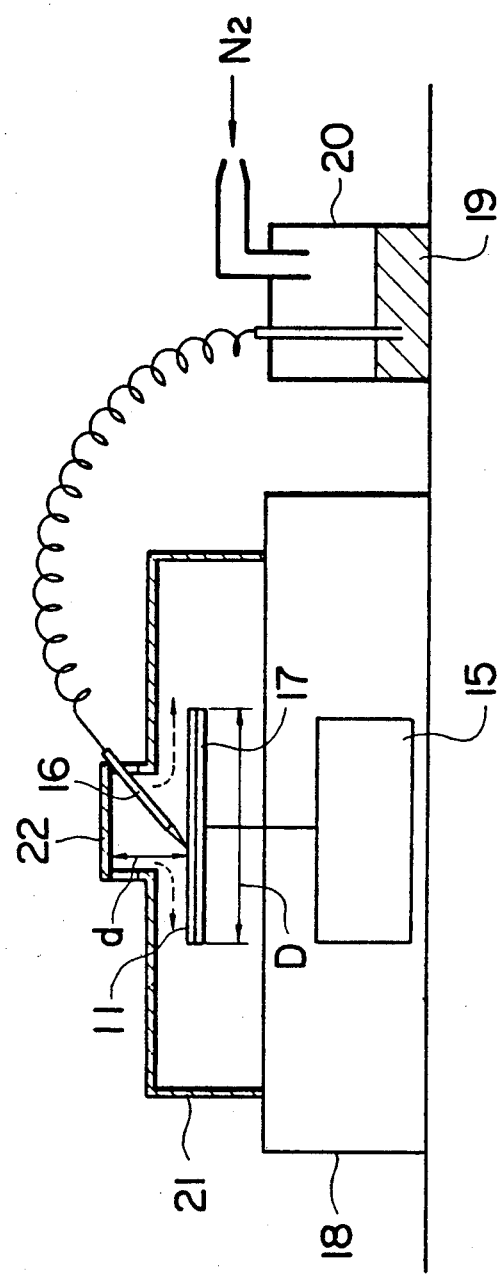
FIG. 16 is a schematic cross sectional view of a coating device used in the embodiments.

FIG. 16 shows a schematic cross sectional view of a coating device, including a motor 1s, a coating nozzle 16, a turntable 17 on which a disk substrate 11 is placed, a main 18 of the coating device, a pressurizing pump 20, and a housing 21. While the housing 21 has the coating nozzle 16 passing therethrough, the vicinity of the turntable 17 isolated from the outside air by the housing 21 and the interior of the housing 21 is kept in a substantially perfectly sealed condition.

The concentration of the dye or the dye composition is in the range from 0.4 wt %-20.0 wt %. When this concentration exceeds 20.0 wt %, the final thickness of the film is excessively thick, pits are not successfully defined when recording is effected. On the other hand, when the concentration is less than 0.4 wt %, a drawback such as the formation of pin holes is caused.

A rotational speed of the substrate 11, i.e., the rotational speed of the substrate for centrifuging out the excessive dye or the dye composition or the solvent is adjusted from 350 to 6500 rpm. When the rotational speed is less than 350 rpm, a centrifugal force is insufficient, and thus a drying speed of the inner circumference of the recording layer 12 is different from that of the outer circumference thereof with a result of an irregular film thickness, whereas when the rotational speed exceeds 6500 rpm, the film thickness is excessively thin, and thus a desired film thickness cannot be obtained.

Further, the vicinity of the turntable 17 must be sealed, or almost perfectly sealed since the dye or the dye composition is actually dropped, the turntable 17 being rotated. With this arrangement, a gas flow caused by the rotation of the turntable 17 can be minimized. This gas flow is shown by the dotted lines in FIG. 16. A condition under which the gas flow is generated greatly depends on the length of a distance d between the substrate 11 and the highest position 22 in the sealed housing, and thus the length d was determined to be one and half times the diameter of the substrate 11 or less. In addition, the partial pressure of the solvent in gas phase can be increased by keeping the turntable 17 in the sealed condition or in the almost perfectly sealed condition, thereby the wettability of the solution on the substrate 11 is improved. With this arrangement, the uniformity of the film is greatly improved.

Figure 17:
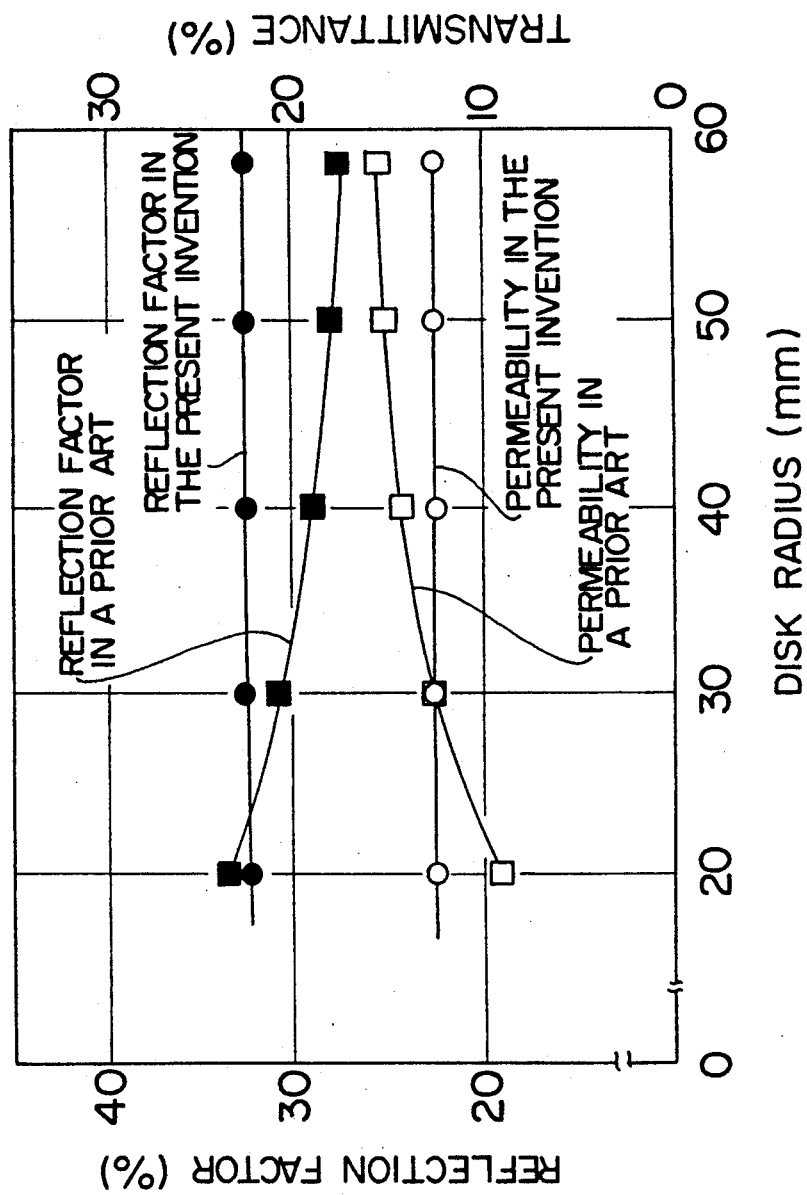
FIG. 17 is a characteristic diagram illustrative of the variations of optical properties caused by differences of coating techniques.

FIG. 17 shows the variations of optical properties (reflection factor and transparency) in radial directions of cases wherein the turntables are sealed and cases the prior art.

As apparent from FIG. 17, while the prior art shows optical properties varying ±10% or more in relative values with respect to average values, this embodiment can make variations limited to ±5% or less in relative values with respect to the average values, which is advantageous in that a uniform recording/reading property and the like can be obtained.

A spin coating time, i.e., a rotation time of the substrate 1 after the dye or the dye composition is dropped is determined to be 1 sec. or more. When the spin coating time is less than 1 sec. the dye or the dye composition cannot be sufficiently dispersed on a signal pattern forming surface.

In addition, the spin coating can be carried out with different rotational speeds set in several stages as necessary. This is because a rotational speed suitable for forming a uniform film and another rotational speed for drying the film which is almost formed are required, and thus a rotation method composed of a first stage with a low rotational speed and a second stage with a rotational speed higher than the first stage is employed.

The film is dried at a temperature of 10-115° C. after the spin coating is completed.

The time for drying is in the range from about 15 sec. to 135 sec. to make the result of temperature (° C.) ×time (sec.) to be less than about 1300.

When the result is less than about 150 the film can not be completely dried. To the result which is more than about 1300 causes inconveniences such as thermal deformation of the substrate or the like. Note that the rotation mode and the like of the substrate can be arbitrarily adjusted in a process for dropping the dye or the dye composition. For example, a mode wherein a solution of the dye composition is almost uniformly coated on the substrate at rest and then the rotation of the substrate is accelerated to the maximum rotational speed in a moment, a mode wherein the solution of the dye or the dye composition is dropped from a clamping area to the substrate being rotated at a suitable rotational speed to the outer circumference thereof and the like can be employed. Returning to FIG. 6 again, a thin layer 13 is composed of a hydrophilic polymer material formed on the above recording layer 2 by a spin coating method and, for example, the following water-soluble resins can be used as this material.

1. polyvinyl alcohol
2. polyethylene oxide
3. polyacrylic acid
4. polystyrene-sodium-sulfonic acid
5. polyvinyl pyrolydone
6. polymethacrylic acid
7. polypropylene glycol
8. methyl cellulose
9. polyvinyl nitrate In addition, the following thermoplastic synthetic resins can be also used as the thin layer 3.

1. fluoro resin such as poly-tera-fluoro ethylene; polychlorotrifluoroethylene; vinylidene fluoride; tetrafluoroethylene-hexafluoro-propylene-copolymer; vinylidene fluoride-hexafluoropropylene-copolymer; vinylidene fluoride-chlorotrifluoroethylene-copolymer; tetrafluoroethylene-perfluoroalkyl vinyl ethercopolymer; tetrafluoroethylene-ethylene copolymer and the like.
2. imide resin such as polyimide; polyamide-imide; polyester-imide and the like.
3. amide resin such as nylon-6; nylon-11; nylon-12; nylon-66; nylon-610; mixture of nylon 610; nylon 66 and the like.
4. ethylene resin such as polyethylene; cross-linked polyethylene; ethylene-acrylic acid ester copolymer; ionomer resin and the like.
5. polypropylene
6. styrene resin such as polystyrene; styrene-acrylonitrile copolymer; styrene-acrylonitrile-butadiene copolymer and the like.
7. polyvinyl chloride
8. polyvinylidene chloride
9. polyvinyl acetate
10. polyvinyl acetal
11. polycarbonate
12. polyacetal
13. saturated polyester resin such as polyethylenetetraphthalate; polybutylene-terephthalate and the like.
14. polyphenylene oxide
15. polysulfone Further, the following rubbers can be used as the thin layer 13.

1. diene rubber such as styrene-butadiene rubber, butadiene rubber; isoprene rubber; acrylo-nitrilebutadiene rubber; chloroprene rubber and the like.
2. olefine rubber such as butyl rubber; ethylenepropyrene rubber; acrylic rubber; chlorosulfonic polyethylene rubber; fluoro rubber and the like.
3. silicone rubber
4. urethane rubber
5. polysulfide rubber In this embodiment, polyvinyl alcohol (PVA) is used as the thin film 13 and a spin coating of the water solution of the PVA is effected to form the thin film 13 having a film thickness of 120 nm. Incidentally, since the thin film 13 is composed of hydrophilic polymer such as PVA and the like, it has a deteriorated moisture resistance. Therefore, as described above, the thin layer 13 is subjected to a cross-linking treatment to be provided with a water resistance (moisture resistance) and heat resistance by being made insoluble to water.

Sixth Embodiment

Next, a sixth embodiment will be described. First, a polycarbonate substrate with a diameter of 130 mm was made by an injection molding method. A dye solution made by dissolving a cyanine dye of 0.5 wt % having the following molecular structure into methanol was applied to the substrate by a spin coating method and a recording layer was formed.

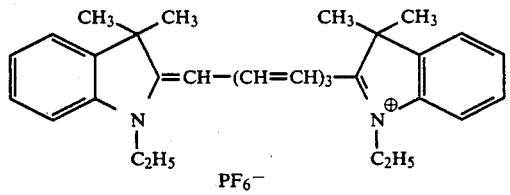

The condition to effect the spin coating was as follows. While the substrate was rotated at 490 rpm, the dye solution was dropped to the center thereof. After the substrate was rotated for 30 sec. it was further rotated for 30 sec. at 3000 rpm. This spin coating was carried out using the coating device shown in FIG. 16, the housing having a volume of 5000 cm³ was sealed, and the length of d was determined to be 12 cm. After the spin coating was finished, the substrate was dried for 30 sec. or more at a room temperature to form the recording layer composed of the cyanine dye on the substrate.

Next, a coating solution for a thin layer was prepared in such a manner that polyvinyl alcohol of 2.5 wt % was dissolved in water as a material for this thin layer, and further bichromate ammonium was added to the water as a cross-linking agent. This coating solution was dropped to the overall recording area of the substrate at rest, and then the substrate was rotated for 20 sec. at 2000 rpm to remove an excessive solution, and further it was rotated for 1 min. at 6000 rpm to accelerate the drying of the substrate. The coating device shown in FIG. 16 was also used for this spin coating.

Ultraviolet rays were irradiated to the thin layer formed as described above to polymerize the polyvinyl alcohol for a water-proofing (moisture resistant) treatment. Note that a thickness of the thin layer must be 60 nm or more to prevent the recording layer from being affected by the ultraviolet rays.

FIG. 18 shows a result of the measurement of modulation degree which was obtained from data recorded with a pulsewidth of 220 n sec. using various powers while an optical disk provided by this embodiment was rotated at 600 rpm. The modulation degree used here is defined as the degree of sensitivity of the recording layer, and it is represented by the following equation assuming that a reflection factor before recording is A and that after recording is B.

modulation degree = $1 - (B/A)$

A curve A shown in FIG. 18 is obtained by an optical disk of this embodiment and a curve B shows a characteristic of an optical disk not provided with the thin layer.

As apparent from FIG. 18, the formation of the thin film disclosed by this invention increases recording sensitivity because of the reasons as follows. While pits on the recording layer is mainly formed by partial melting and diffusion of the recording layer, vaporization and sublimation slightly occur at the same time of the melting. These vaporized matters are cut off from escape by the presence of the thin layer composed of the polyvinyl alcohol and increase a pressure in a closed space. The diffusion is accelerated by the increased pressure so that good pits are formed with a result of the increase in the recording sensitivity.

As apparent from a result of the above thermogravimetric analysis (FIG. 15), a thermal behavior of the recording layer (melting, vaporization and sublimation) depends on a material. Different materials may be used depending on recording conditions required. For example, when a recording is to be carried out with lower power, materials which start to melt at a temperature of 230° C. or less is preferably used, as described below.

With respect to a reproducing light resistant characteristic, the result was good such that a deterioration factor of a light reflecting factor of 0% was obtained with a reading power of 0.5 mW and the number of reading out of $10^5$.

Seventh Embodiment

Figure 19:
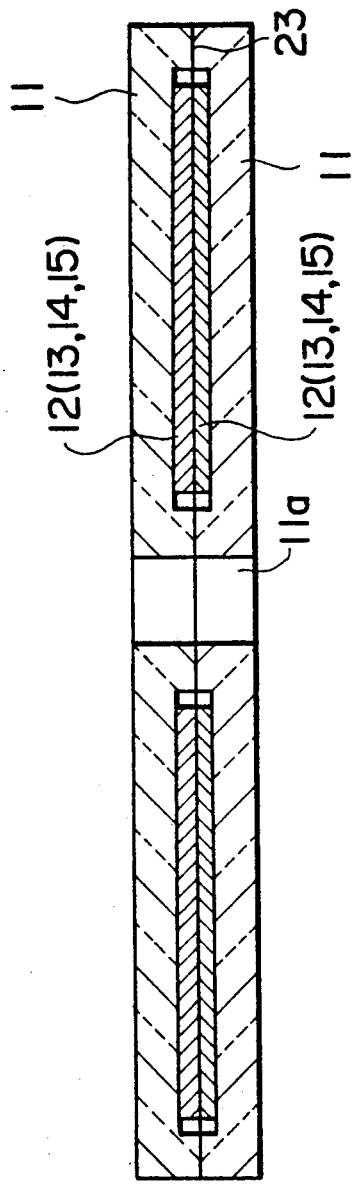
FIG. 19 is a vertical cross sectional view of a bonding type optical disk of a seventh embodiment according to the present invention.

FIG. 19 is a diagram explanatory of a seventh embodiment of the present invention. In this embodiment, two single plates each composed of a substrate 11 with a recording layer 12 and a thin layer, and if necessary, an overcoat layer 14, an underlayer 15 and the like formed thereon are integrally bonded together through an adhesive layer 23, e.g., an epoxy resin, a UV curing resin or the like.

Eighth Embodiment

Figure 20:
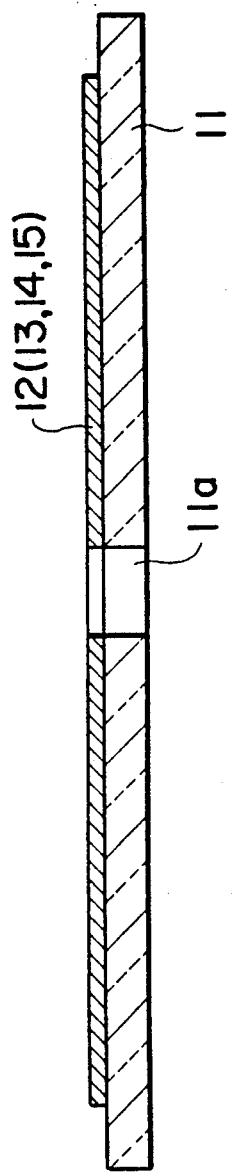
FIG. 20 is a vertical cross sectional view of a single plate type optical disk of an eighth embodiment according to the present invention.

FIG. 20 is a diagram explanatory of an eighth embodiment of the present invention, wherein, a single plate composed of a substrate 11 with a recording layer 12 and a thin layer 13, and, if necessary an overcoat layer 14, an underlayer 15 and the like formed thereon is used solely.

Figure 21:
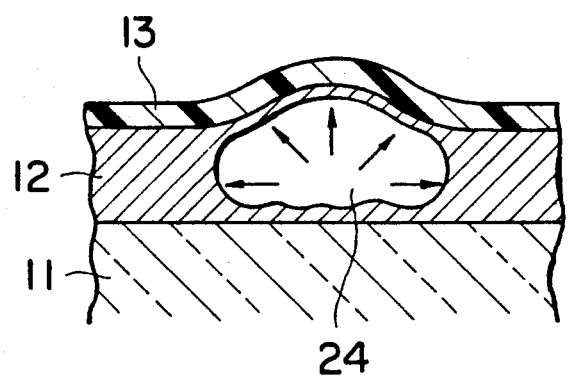
FIGS. 21 and 22 are enlarged cross sectional views in the vicinity of a recording pit.
Figure 22:
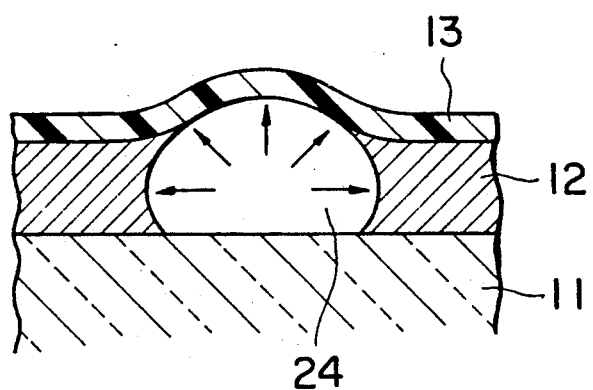

FIG. 21 and FIG. 22 are enlarged cross sectional views of the vicinity of the recording layer.

In a recording pit shown in FIG. 21, a void 22 is formed with the recording layer 12 partially and thinly remaining on the thin layer 13 side, whereas, in a recording pit shown in FIG. 22, the recording layer 12 even on the thin layer 13 side is almost perfectly heat-melted and forms a hollow-shaped void 24. The recording pits have different shapes depending on a material of the recording layer 12, a film thickness of the recording layer 12, a recording power, an irradiation time of a beam and the like.

While cases wherein voids are formed in the recording layer are described according to FIG. 21 and FIG. 22, the voids are not always formed in the recording layer depending on the irradiation condition of a radiation beam, and the thin layer may be expanded toward the side opposite to the substrate is a thermal expansion.

Ninth Embodiment

Next, a ninth embodiment will be described.

A spin coating was effected on a polycarbonate substrate to form a recording layer of 60 nm thick using a methyl alcohol solution (dye solution) containing 1.5 wt. % of 1-butyl-2-(7-(1-butyl-2-indolinydene)-1,3,5-heptatriethyl)-3,3-dimethyl -indolinium-hexafluorophosphate.

Separately from this operation, a 10% water solution (thin layer forming solution) containing a mixture of polyvinyl alcohol having a degree of saponification of 88.0 and a degree of polymerization of 1700 and bichromate ammonium of 10% with respect to the polyvinyl alcohol was prepared. This thin layer forming solution was applied on the recording layer by a spin coating to form a thin layer of 60 nm thick.

After the thin layer was dried, ultraviolet rays were irradiated to the thin layer for 30 sec. from a position 15 cm apart therefrom with a power of 2.4 KW to form an air sandwich type optical disk using an organic dye by cross-linking and curing the polyvinyl alcohol.

The conditions of an optical recording system using this oPtical disk were as follows. More specifically, a semiconductor laser having an oscillating wavelength of 830 nm and an objective lens having a NA of 0.53 were used. The above disk was rotated at 1800 rpm and data was recorded with a pulsewidth of 100 n/s and a recording power of 7 mW. As a result, a modulation degree of 81% was obtained.

Next, the states under which recording pits were formed will be described. As described above, the optical data recording medium of the present invention is provided with the recording layer mainly composed of the organic dye formed on the transparent substrate and the thin layer formed on the recording layer serving as a pressurizing layer. When a laser beam is irradiated to this optical data recording medium, the above recording layer is partially heated and reaches to a liquefied state to make the expansion of its volume. However, the state of the thin layer on the recording layer is not changed. As a result, the recording layer is pressurized and its interior temperature is further increased. This temperature increase causes the recording layer to be vaporized and its interior pressure to be further increased, and thus at last the thin layer as the pressurizing layer is deformed. When it reaches this critical state, however, the organic dye is separated from the surface of the substrate and no dye remains on the substrate and the laser is not substantially reflected.

As described above, the heat energy generated in the recording layer by the irradiation of the laser beam is prevented from being discharged externally by the thin layer formed on the recording layer and accumulated internally. This accumulation of the energy at last pushes up the thin layer as the pressurizing layer and deforms it, and this deformation continues until the internal energy becomes lowered. In addition, the heat energy of the portion where the laser beam is irradiated is made uniform in the area and volume where the beam is irradiated and the overall irradiated portion reaches a high temperature. As a result, the dye material in the irradiated area is uniformly liquefied and/or vaporized and securely separated from the substrate.

The material mainly composed of the organic dye separated from the substrate is distributed again to the thin layer as the pressurizing layer and/or absorbed and diffused in the thin layer.

FIG. 23 through FIG. 28 are schematic enlarged cross sectional views of a recording pit when an optical data recording medium omitting an underlayer is used.

Figure 23:
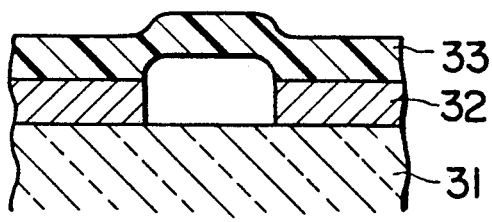
FIG. 23 through FIG. 28 are schematic enlarged cross sectional views of a recording pit in an optical disk of a ninth embodiment according to the present invention.

In the case of FIG. 23, a portion of a recording layer 32 where a laser beam is irradiated disappears from the surface of a substrate 31 and the portion of a thin layer 33 corresponding to the disappeared portion is pushed upwardly in a substantially angular shape.

Figure 24:
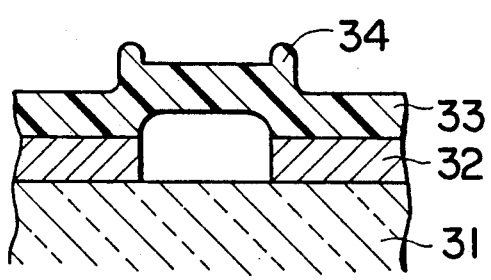

In the case of FIG. 24, while a portion of a thin layer 33 is pushed upwardly like the thin layer in FIG. 23, an annular projection 34 is defined around the portion pushed upwardly.

Figure 25:
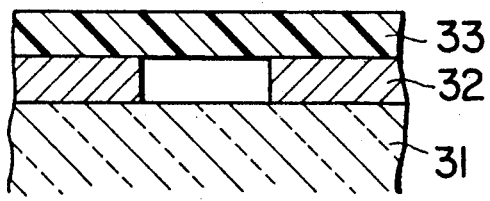

In the case of FIG. 25, while a portion of a recording layer 32 where a laser beam is irradiated disappears from the surface of a substrate 31, a thin layer 33 is not deformed.

Figure 26:
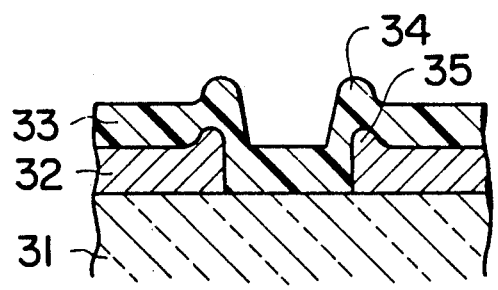

In the case of FIG. 26, a portion of a recording layer 32 where a laser beam is irradiated disappears from the surface of a substrate 31 and an annular projection 35 is defined around the disappeared portion. On the other hand, a thin layer is recessed toward the disappeared portion.

Figure 27:
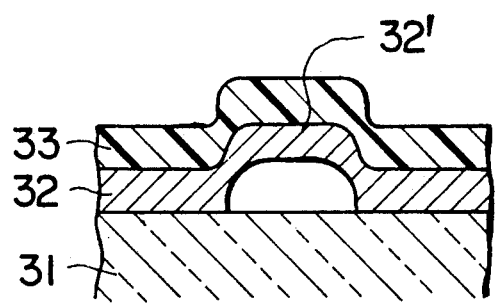
Figure 28:
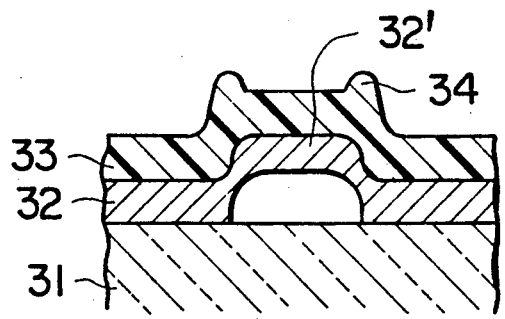

In the cases of FIGS. 27 and 28, a material of a recording layer 32 is partly attached again to the inner surface of a thin layer 33. While the recording layer 32' attached to the inner surface of the thin layer 33 is principly continuous to the recording layer 32, it is occasionally separated from the recording layer 32.

Tenth and Eleventh Embodiments

Figure 29:
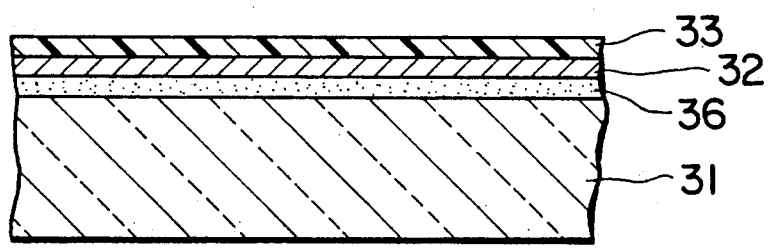
FIG. 29 is an enlarged cross sectional view of a main part of an optical disk of a tenth embodiment according to the present invention.
Figure 30:
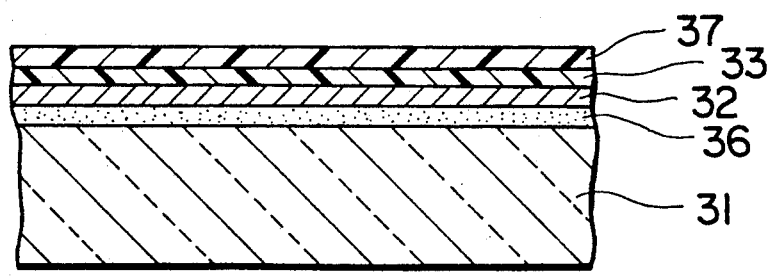
FIG. 30 is an enlarged cross sectional view of a main part of an optical disk of an eleventh embodiment according to the present invention.
Figure 31:
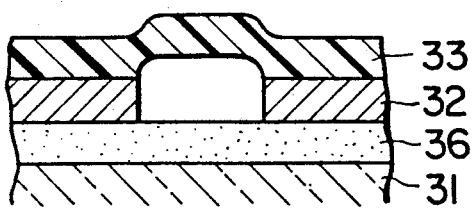
FIG. 31 through FIG. 37 are schematic enlarged cross sectional views of a recording pit in an optical disk of a tenth embodiment according to the present invention.
Figure 32:
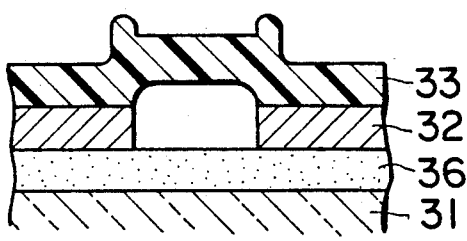
Figure 33:
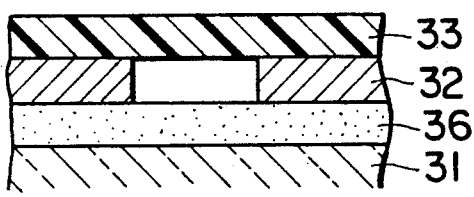
Figure 34:
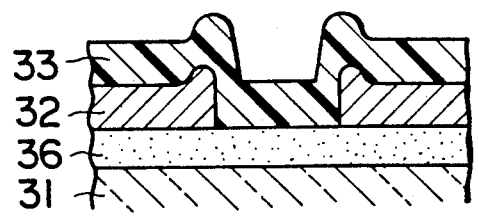
Figure 35:
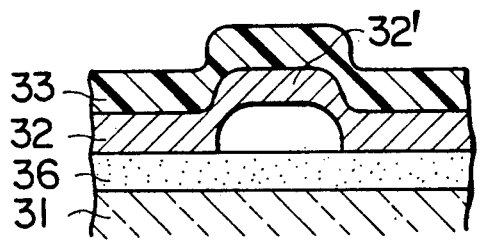
Figure 36:
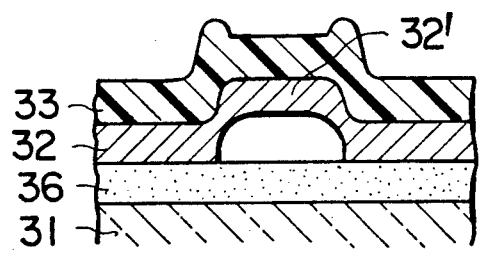
Figure 37:
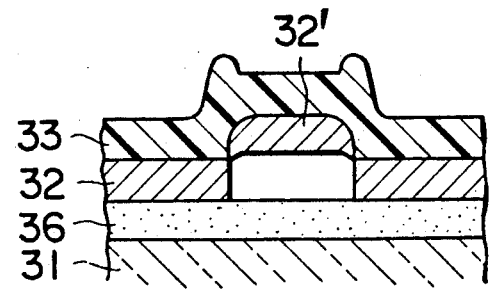

FIG. 29 and FIG. 30 are enlarged cross sectional views illustrative of an optical data recording medium of tenth and eleventh embodiments of the present invention.

In the case of FIG. 29, an underlayer 36 is formed between a substrate 31 and a recording layer 32. In the case of FIG. 30, an overcoat layer 37 is further formed on the upper surface of the thin layer 33.

An autoxidation compound or the like is used as a material of the underlayer 36, and in this embodiment polyvinyl nitrate is used a this autoxidation compound.

As material of the overcoat layer 37, for example, an acrylate resin or the like is used.

The following materials can be used as the thin layer and/or the underlayer: hydrocarbon resin; acrylic acid resin; vinyl acetate; vinyl alcohol resin, halogenated resin; nitrogenous vinyl compound; diene compound; polyether resin; polyethylene imine resin; phenol resin; amino resin; aromatic hydrocarbon resin; ketone resin; polyester resin; polyamide resin; silicon resin; furan resin; polysulfide rubber; isoprene rubber; neoprene rubber; chlorosulfonic polyethylene rubber; acrylonitrile-butadiene rubber; styrene-butadiene rubber; polybutadiene; polyurethane resin; polyurea resin; epoxy resin; acid condensation resin; cellulose ester; cellulose ether; sodium carboxymethyl cellulose; ammonium carboxymethyl cellulose; nitrocellulose resin; nitrated nitrocellulose resin; protein resin; renaturated of natural resin; fatty acid; fatty acid anhydrate; organic metal compound using chalcogenite metal, alloy or oxide thereof, metal other than chalcogenite metal, alloy or oxide thereof, alkylsilane or alkoxysilane, or using titanium, boron or aluminum in place of silicon; and hydrolyzed compound of these chemicals and the like.

FIG. 31 through FIG. 37 are schematic enlarged cross sectional views of a recording pit when the optical data recording shown in FIG. 29 is used. Since this recording pit is the same as those shown in FIG. 23 through FIG. 28 except an underlayer 36, the description thereof is omitted. In the case shown in FIG. 36, however, a recording layer 32' attached again to the inner surface of a thin layer 33 is continuous to a recording layer 32, whereas in the case shown in FIG. 37, a recording layer 32' is separated from a recording layer 32.

Twelfth, Thirteenth and Fourteenth Embodiments

Figure 38:
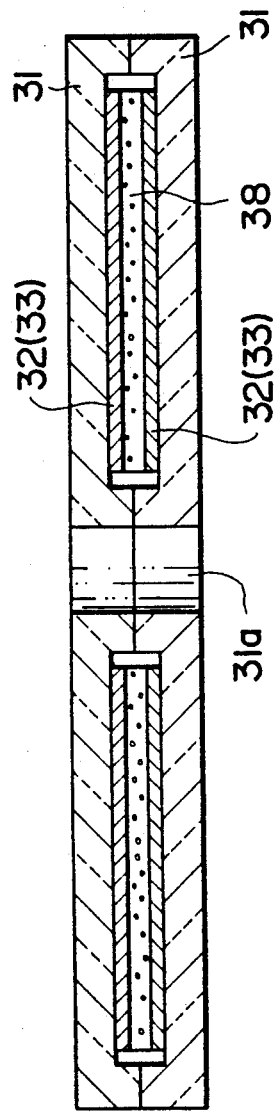
FIG. 38 is a vertical cross sectional view of an optical disk of a twelfth embodiment according to the present invention.
Figure 39:
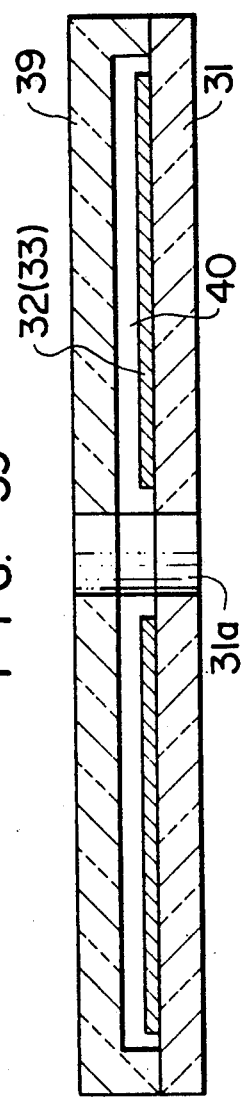
FIG. 39 is a vertical cross sectional view of an optical disk of a thirteenth embodiment according to the present invention.
Figure 40:
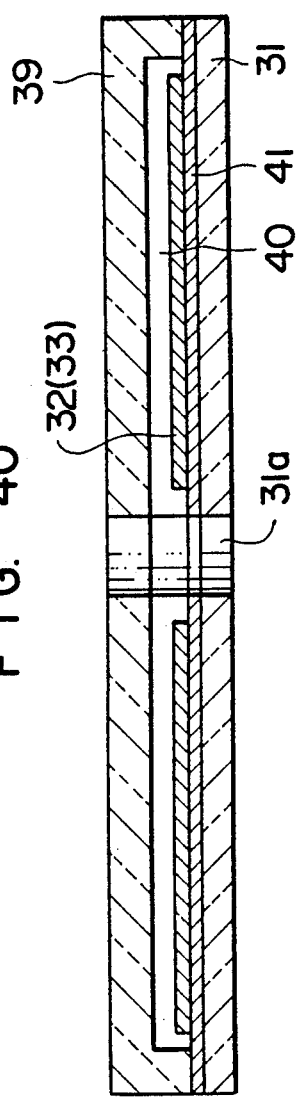
FIG. 40 is a vertical cross sectional view of an optical disk of a fourteenth embodiment according to the present invention.

FIG. 38 through FIG. 40 are cross sectional views of optical disks a twelfth embodiment through fourteenth embodiment of the present invention.

In the twelfth embodiment shown in FIG. 38, two single plates each composed of a substrate 31 with a recording layer 32, a thin layer 33 and the like formed thereon are integrally bonded together through an elastic layer 38 of, e.g., polyurethane or the like.

In the thirteenth the embodiment shown in FIG. 39, the above recording single plate is bonded to a protective plate 39. In FIG. 39 an air gap 40 is designated.

In the fourteenth embodiment shown in FIG. 40, a reflecting layer 41 is interposed between a substrate 31 and a recording layer 32, and a transparent protective plate 39 is used. In and delete ' designates FIG. 40 designates an air gap 40 is also designated.

Next, an optical interference effect of an optical data recording medium will be described with references to FIGS. 41 and 42. FIG. 41 is a diagram explanatory of an energy reflection factor R. Assuming that an amplitude reflection factor is represented by $r_{12}$ and an amplitude transmissivity is represented by $t_{12}$ when light travels from a medium 1 to a medium 2, the amplitude reflection factor $r_{12}$ and the amplitude transmissivity $t_{12}$ in vertical incidence are expressed by the following equations using reflection factors $n_1$, $n_2$ of the mediums 1 and 2.

$$r_{12} = \frac{n_2 - n_1}{n_1 + n_2} \qquad (1)$$

$$t_{12} = \frac{2n_1}{n_1 + n_2} \qquad (2)$$

In addition, the energy reflection ratio R is expressed by the following equation using the amplitude reflection factor r.

$$R = |r|^2 \qquad \ldots (3)$$

More specifically, assuming that an incident wave is represented by $a_0 \cos \theta$ and a composite wave is represented by $a' \cos (\theta + \Delta)$, the energy reflection factor R is expressed by the following equation.

$$R = \left(\frac{a'}{a_0}\right)^2 \qquad (4)$$

Using the above, reflection factors in the following respective states were calculated.

FIG. 42 is a diagram explanatory of composite light composed of light reflected at respective interfaces of an optical data recording medium composed of a substrate with a recording medium composed of a substrate with a recording layer and a thin layer formed thereon sequentially. Respective symbols in FIG. 42 are designated as follows.

PC substrate of polycarbonate
dye : recording layer of organic dye
PVA : thin layer of polyvinyl alcohol
air : air (air gap)
$n_0$ : refraction factor of air ($n_0 = 1$)
$n_1$ : refraction factor PC ($n_1 = 1.6$)
$n_2$ : refraction factor of dye ($n_2 = 2.7$)
$n_3$ : refraction factor of PVA ($n_3 = 1.5$)
$d_1$ : film thickness of PVA
$d_2$: film thickness of dye
$A_1$ : light reflected at interface between PC and dye
$A_2$ light reflected at interface between dye and PVA
$A_3$ light reflected at interface between PVA and air Light reflected at the respective interfaces $A_1$, $A_2$, and $A_3$ is expressed by the following equations.

$$A_1 = r_{12} \cos \theta \qquad (5)$$

$$A_2 = t_{12} r_{23} t_{21} \cos\left(\theta + \frac{4\pi n_2 d_2}{\lambda}\right) \qquad (6)$$

$$A_3 = t_{12} t_{23} r_{30} t_{32} t_{21} \cos\left(\theta + \frac{4\pi(n_2 d_2 + n_3 d_1)}{\lambda}\right) \qquad (7)$$

Therefore, composite light $A_1 + A_2 + A_3$ composed of light $A_1$, $A_2$, and $A_3$ reflected at the respective interfaces is obtained by the following equation.

$$(A_1 + A_2 + A_3) = r_{12} \cos \theta + t_{12} r_{23} t_{21} \cos\left(\theta + \frac{4\pi n_2 d_2}{\lambda}\right) + \qquad (8)$$

$$t_{12} t_{23} r_{30} t_{32} t_{21} \cos\left(\theta + \frac{4\pi(n_2 d_2 + n_3 d_1)}{\lambda}\right)$$

This equation can be expressed by $a' \cos (\theta + \Delta)$.

The energy reflection factor R is determined by solving the right side of the equation $(8) = a' \cos (\theta + \Delta)$, representing $a'$ by r, t, n, d, $\lambda$, inserting respective values in them, and squaring the (resulted value of $a'$) (because $a_0 = 1$).

FIG. 43 is a characteristic diagram illustrative of a change of the energy reflection factor R obtained when a film thickness $d_1$ of a PVA thin layer and a wavelength $\lambda$ of incident light are fixed and a film thickness $d_2$ of a recording layer is sequentially changed in the optical data recording medium shown in FIG. 42.

Figure 44:
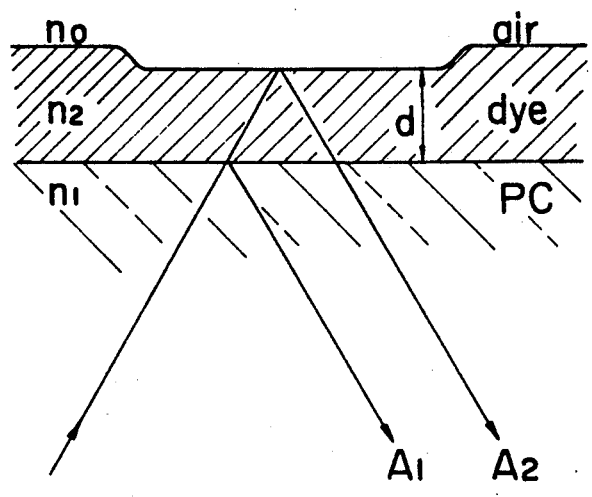
FIG. 44 is a diagram explanatory of composite light composed of light reflected at respective interfaces of an optical data recording medium composed of a substrate having only a recording layer formed thereof.

FIG. 44 is a diagram explanatory of composite light composed of light reflected at respective interfaces of an optical data recording medium composed of a substrate having only a recording layer formed thereon.

The composite light $(A_1 + A_2)$ in this case is expressed by the following equation like the case in FIG. 42.

$$(A_1 + A_2) = r_{12} \cos \theta + t_{12} r_{20} t_{21} \cos\left(\theta + \frac{4\pi n_2 d}{\lambda}\right) = \qquad (9)$$

$$a' \cos(\theta + \Delta)$$

Figure 45:
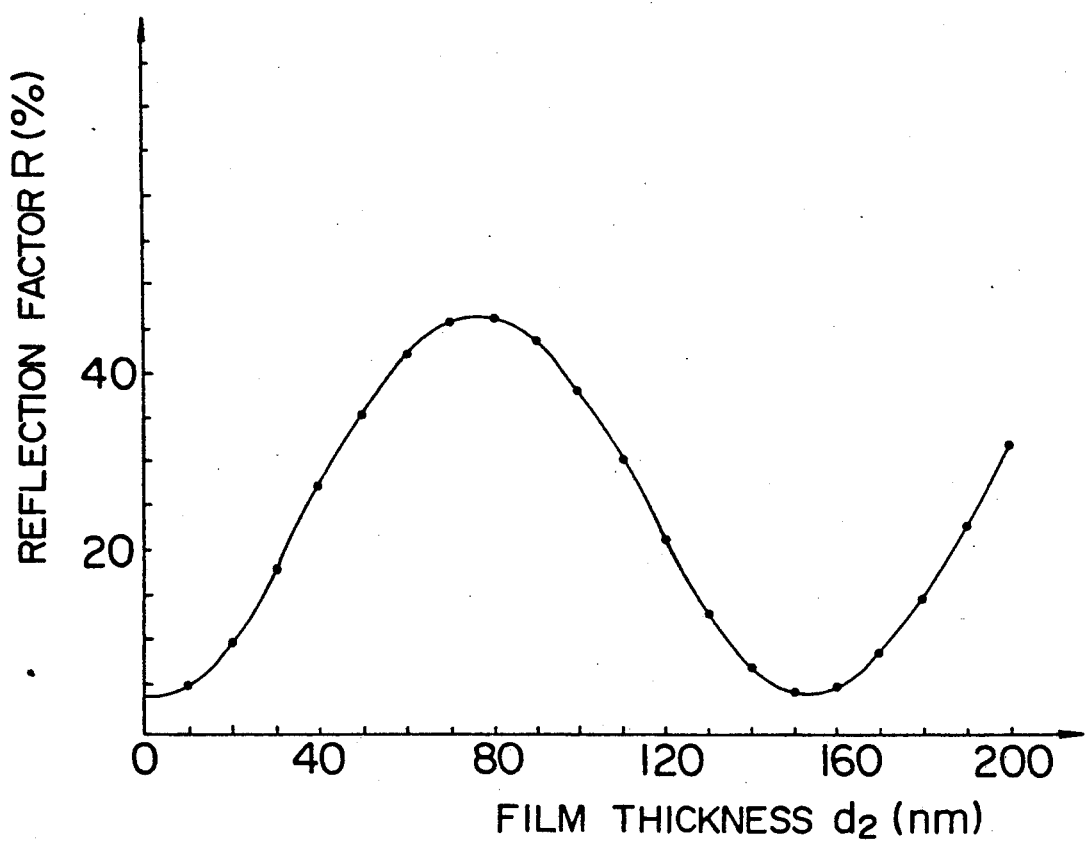
FIG. 45 is a characteristic diagram illustrative of a change of an energy reflection factor when a film thickness of a recording layer of the optical data recording medium shown in FIG. 44 is changed.

FIG. 45 is a characteristic diagram illustrative of a change of the energy reflection factor R obtained when a wavelength $\lambda$ of incident light is fixed and a film thickness d of a recording layer is sequentially change in the optical data recording medium shown in FIG. 44.

FIG. 46 is a diagram explanatory of composite light composed of light reflected at respective interfaces of an optical data recording medium composed of a substrate having a recording layer and a thin layer sequentially formed thereon and a void defined at the intermediate portion of the recording layer. Respective symbols in FIG. 46 are designated as follows.

$n_0$ : refraction factor of air and a void ($n_0 = 1$)
$d_2$ : thickness of the recording layer remaining between a PVA layer and the void
$d_3$ : void thickness
$d_4$ : thickness of the recording layer remaining between the void and a PC substrate
$A_2$ : light reflected at an interface between the recording layer having the film thickness of $d_4$ and the void
$A_3$ : light reflected at an interface between the void and the recording layer having the film thickness of $d_2$
$A_4$ : light reflected at an interface between the recording layer having the film thickness of $d_3$ and the PVA layer
$A_5$ : light reflected at an interface between the PVA layer and air Light reflected at the respective interfaces $A_1$–$A_5$ are expressed by the following equations.

$$A_1 = r_{12} \cos \theta \qquad (10)$$

$$A_2 = t_{12} r_{20} t_{21} \cos\left(\theta + \frac{4\pi n_2 d_4}{\lambda}\right) \qquad (11)$$

$$A_3 + t_{12} t_{20} r_{02} t_{02} t_{21} \cos\left(\theta + \frac{4\pi(n_2 d_4 + n_0 d_3)}{\lambda}\right) \qquad (12)$$

-continued $$A_4 = t_{12}t_{20}t_{02}r_{23}t_{20}t_{02}t_{21} \cos\left(\theta + \frac{4\pi(n_2d_4 + n_0d_3 + n_2d_2)}{\lambda}\right) \quad (13)$$

$$A_5 = t_{12}t_{20}t_{02}t_{23}r_{30}t_{32}t_{20}t_{02}t_{21}$$

$$\cos\left(\theta + \frac{4\pi(n_2d_4 + n_0d_3 + n_2d_2 + n_3d_1)}{\lambda}\right)$$

Therefore, composite light $(A_1+A_2+A_3+A_4+A_5)$ composed of light $A_1-A_5$ reflected at the respective interfaces is obtained by the following equation (15).

$$(A_1 + A_2 + A_3 + A_4 + A_5) = r_{12} \cos\theta +$$

$$t_{12}r_{20}t_{21} \cos\left(\theta + \frac{4\pi n_2 d_4}{\lambda}\right) +$$

$$t_{12}t_{20}r_{02}t_{02}t_{21} \cos\left(\theta + \frac{4\pi(n_2d_4 + n_0d_3)}{\lambda}\right) +$$

$$t_{12}t_{20}t_{02}r_{23}t_{20}t_{02}t_{21} \cos\left(\theta + \frac{4\pi(n_2d_4 + n_0d_3 + nd_2)}{\lambda}\right) +$$

$$t_{12}t_{20}t_{02}t_{23}r_{30}t_{32}t_{20}t_{02}t_{21} \cos\left(\theta + \right.$$

$$\left.\frac{4\pi(n_2d_4 + n_0d_3 + n_2d_2 + n_2d_1)}{\lambda}\right) = a' \cos(\theta + \Delta)$$

FIG. 47 is a characteristic diagram illustrative of a change of the energy reflection factor R obtained when a film thickness $d_1$ of a PVA thin layer, film thicknesses $d_2$ and $d_4$ in a recording layer and a wavelength $\lambda$ of incident light are fixed and a void thickness $d_3$ is sequentially changed in the optical data recording medium shown in FIG. 46. Note that when the values of $d_2$ and $d_4$ are decreased in FIG. 47, the energy reflection factor R moves in close to a curve shown by symbols ● and when the values of $d_2$ and $d_4$ are increased, it moves in close to a curve shown by symbols ▲.

FIG. 48 is a diagram explanatory of composite light composed of light reflected at respective interfaces of an optical data recording medium composed of a substrate having a recording layer formed thereon and a void defined at the intermediate portion of the recording layer. Respective symbols in FIG. 48 are designated as follows.

$n_0$ refraction factor of air and a void ($n_0=1$)
$d_1$ thickness of the recording layer remaining between air and the void
$d_2$ : void thickness
$d_3$ : thickness of the recording layer remaining between the void and a PC substrate
$A_2$ : light reflected at an interface between the recording layer having the film thickness of $d_3$ and the void
$A_3$ : light reflected at an interface between the void and the recording layer having the film thickness of $d_1$
$A_4$ : light reflected at an interface between the recording layer having the film thickness of $d_1$ and air Light $A_1-A_4$ reflected at the respective interfaces are expressed by the following equations.

$$A_1 = r_{12} \cos\theta \quad (16)$$

$$A_3 = t_{12}r_{20}t_{21} \cos\left(\theta + \frac{4\pi n_2 d_3}{\lambda}\right) \quad (17)$$

$$A_3 = t_{12}t_{20}r_{02}t_{02}t_{21} \cos\left(\theta + \frac{4\pi(n_2d_3 + n_2d_2)}{\lambda}\right) \quad (18)$$

$$A_4 = t_{12}t_{20}t_{02}r_{20}t_{02}t_{21} \cos\left(\theta + \frac{4\pi(n_2d_3 + n_0d_2 + n_2d_1)}{\lambda}\right) \quad (19)$$

Therefore, composite light $(A_1+A_2+A_3+A_4+)$ composed of light $a_1-A_4$ reflected at the respective interfaces is expressed by the following equation (20).

$$(A_1 + A_2 + A_2 + A_4) = r_{12} \cos\theta +$$

$$t_{12}r_{20}t_{21} \cos\left(\theta + \frac{4\pi n_2 d_3}{\lambda}\right) +$$

$$t_{12}t_{20}r_{02}t_{02}t_{21} \cos\left(\theta + \frac{4\pi(n_2d_3 + n_2d_2)}{\lambda}\right) +$$

$$t_{12}t_{20}t_{02}r_{02}t_{02}t_{21} \cos\left(\theta + \frac{4\pi(n_2d_3 + n_0d_2 + n_2d_1)}{\lambda}\right) =$$

$$a' \cos(\theta + \Delta)$$

FIG. 49 is a characteristic diagram illustrative of a change of the energy reflection factor R obtained when film thicknesses $d_1$ and $d_3$ in a recording layer and a wavelength $\lambda$ of incident light are fixed and a void thickness $d_2$ is sequentially changed in the optical data recording medium shown in FIG. 48. Note that when the values of $d_1$ and $d_3$ are decreased in FIG. 49, the energy reflection factor R moves in close to a curve shown by symbols ●, and when the values of $d_1$ and $d_3$ are increased, it moves in close to a curve shown by symbols ▲.

A recording pit is read by a difference between a reflection factor of an unrecorded portion and a reflection factor of a recorded pit portion. Consequently, when a larger difference between the reflection factor of the unrecorded portion and the reflection factor of the recorded portion is provided, a larger modulation degree is obtained. An optical data recording medium having a recording element defined according to the void shape shown in FIGS. 48 and 50 can be provided with a larger difference between the reflection factor of the unrecorded portion and that of the recorded pit portion larger than a difference between those of an optical data recording medium having a recording element defined according to a pit shape shown in FIGS. 42 and 44. That is, a higher modulation degree can be obtained.

Note that the ranges of a film thicknesses of respective portions in FIGS. 46 and 48 are as follows.

The film thicknesses of the respective portions in FIG. 46:

| | |
|---|---|
| $d_1$ (PVA): | 1 mm–10 μm |

-continued

| | |
|---|---|
| d₂ (dye): | 1 mm–5 μm |
| d₃ (void thickness): | 1 mm–5 μm |
| d₄ (dye): | 1 mm–5 μm |

The film thicknesses of the respective portions in FIG. 48:

| | |
|---|---|
| d₁ (dye): | 1 mm–5 μm |
| d₂ (void thickness): | 1 mm–5 μm |
| d₃ (dye): | 1 mm–5 μm |

Fifteenth Embodiment

FIG. 46 is an enlarged cross sectional view of another schematic example of a recording element of an embodiment of the present invention. As shown in FIG. 46, the thin layer of PVA is not deformed.

Micro capsules can be used as described later to define voids in the intermediate portion in a recording layer in the thickness direction without deforming the thin layer.

A thin layer which is finally returned to the original shape white it is temporary deformed in a recording process, is referred to in an example of this embodiment.

Sixteenth Embodiment

FIG. 50 is an enlarged cross sectional view of another schematic example of a recording element of an embodiment of the present invention. As shown in FIG. 50, a fibriform 43 may be formed depending on the material and physical properties of the recording layer 32 and the irradiating conditions of a laser beam.

In addition, the void 42 is not always composed of a single bubble but may be composed of the collection of a plurality of or a multiplicity of bubbles as a whole.

A means for securely forming voids having a predetermined thickness includes a method of using micro capsules. More specifically, fine micro capsules are spin-coated together with the material of a recording layer, and after an optical data recording medium is formed, the surface film covering the capsules is broken by being vaporized or expanded in the recording layer to form the voids by irradiation of light or heat. The interior of the micro capsule may be hollow or filled with an autoxidation compound or the like.

An example of the capsule is composed of polyvinyl nitrate filled in the interior thereof and copolymer of gelatin and anionic polymer forming a coating film as a surface thereof.

Seventeenth Embodiment

FIG. 51 is an enlarged cross sectional view of an optical data recording medium illustrative of a seventeenth embodiment using micro capsules.

First, a polycarbonate substrate 51 with a diameter of 130 mm was made by an injection molding method. A dye solution made by dissolving an organic dye of 0.8 wt % having the following formula was applied to the substrate 51 by a spin coating method and a recording layer 52 was formed.

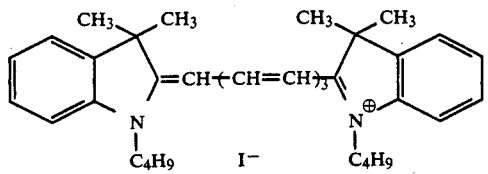

The condition to effect a spin coating was as follows.

While the substrate was rotated at 490 rpm, the dye solution was dropped to the center thereof. After the substrate was rotated for 30 sec. it was further rotated for 30 sec. at 3000 rpm. A volume of 5000 cm³ around a turntable was in a sealed state.

Separately from this operation, a water solution containing 2.5 wt % of polyvinyl alcohol and bichromate ammonium of 10% to the polyvinyl alcohol was prepared. This water solution was spin-coated on a film formed by the above dye.

In this case, after the water solution was substantially uniformly applied to a signal pattern forming surface of the substrate 51 at rest, the substrate 51 was rotated at a speed of 3000 rpm and then rotated for 30 sec. at a speed of 6000 rpm to centrifuge out the excessive water solution of the polyvinyl alcohol, whereby a film having a thickness of 80 nm was formed. Next, ultraviolet rays were irradiated to this film for a few minutes using an ultra high pressure mercury lamp so that a thin film 53 was formed by cross-linking the polyvinyl alcohol with the bichromate ammonium.

A deformation of the thin layer 53 can be made easier by providing an air gap on the thin layer 53.

Micro capsules can be used for a method of forming the air gap on the thin layer 53, an example of which will be shown below.

Micro capsules each having a diameter of 10 μm and composed of polyvinyl nitrate filled in the interior thereof and copolymer of gelatin and anionic polymer forming a coating film as a surface thereof were prepared. These micro capsules were mixed with a water solution of polyvinyl alcohol and this solution was applied to the above thin layer 53 to a thickness of 100 μm to form a micro capsule layer 54.

An overcoat layer 55 of 100 μm thick composed of an acrylate resin was formed on the micro capsule layer 54. After that, ultraviolet rays are irradiated to cure the overcoat layer 55 and the above micro capsules were destroyed at the same time to form the air gap layer having a multiplicity of bubbles.

Eighteenth Embodiment

FIG. 52 is an enlarged cross sectional view of a main part of an optical disk of a eighteenth embodiment of the present invention, wherein 61 designates a disk-shaped substrate, which may be composed of a transparent material of a transparent resin such as polycarbonate, polymethyl methacrylate, polymethyl penten, epoxy resin and the like or transparent ceramics such as glass and the like, and in this embodiment a polycarbonate substrate is used.

A recording layer 62 is formed on the substrate 61 by a spin coating method and composed of a cyanine dye capable of being heat-melted at a temperature of 230° or less and an infrared ray abosrbing agent of 20 wt % or less with respect to the cyanine dye which exhibits absorption in a wavelength region longer than that of the maximum absorption peak of the cyanine dye.

An indol type cyanine dye of cyanine type organic dyes which particularly has the following general formula is preferably used.

General Formula

<img>

In the formula, (T) is a carbon chain to form a methyne chain and composed of a linear chain or polycyclo compound of $C_3$-$C_{17}$, and a hydrogen atom attached to a carbon atom and may be substrated by a halogen atom, <img>

(R" is linear chain of $C_1$-$C_6$ or aromatic ring);

A may be equal to or different from A' and both of them represent an aromatic ring, respectively. A hydrogen atom attached to a carbon atom may be substrated by —I, —Br, —Cl, —$C_nH_{2n+1}$(n+-22), —$OCH_3$, <img>

—NO, and

<img>

(R'"is a linear chain hydrocarbon or an aromatic ring)

B may be equal to or different from B' and both of them represent —O—, —S—, —Se—, —CH=CH—, or <img>

(R""represents an alkyl group);

R may be equal to or different form R', both of them represent an alkyl group of $C_1$-$C_{22}$ and may be substrated by a sulfonyl group or a carboxyl group;

$X^\ominus$ represents anions such as $I^\ominus$ $PF_6^\ominus$, $ClO_4^\ominus$, $Cl^\ominus$, $BF_4^\ominus$ and the like;

m and n represent 0 or integer of 1 through 3, respectively and have a relationship of $m+n \leqq 3$.

Note that while the infrared ray absorbing agent can be arbitrarily determined in relation to the dye, for example, such commercially available products as PA1001, PA1005 and PA1006 (Mitsui Toatsu Kagaku Co., Ltd.), and IR-820 and IRG-002 (Nihon Kayaku Co., Ltd.) can be used.

The above absorbing agent of 20 wt % or less is added to a dye such as a cyanine dye, and when a film is formed, it is dissolved in a solution made by mixing two or more kinds of solvent, such as alcohol solvent and water, alcohol solvent and chemical halide or in an alcohol solution and spin-coated on the substrate.

A thermally deformable layer 63 is composed of hydrophilic polymer formed on the recording layer 62 by a spin coating method. For example, the following materials may be used for this hydrophilic polymer.

(a) polyvinyl alcohol
(b) polyethylene oxide
(c) polyacrylic acid
(d) sodium polystyrene sulfonate
(e) polyvinyl pyrolydone
(f) polymethacrylic acid
(g) polypropylene glycol
(h) methyl cellulose
(i) carboxy-methyl cellulose
(j) polyvinyl nitrate In addition, after a drying process is finished, treatments such as a cross-linking treatment of hydrophilic polymer can be carried out to improve the moisture resistance of a non-soluble film.

An example of this embodiment will be described below.

First, a polycarbonate substrate with a diameter of 130 mm was made by an injection molding method. A dye solution was prepared by the following method.

The following cyanine dye was dissolved in methanol to prepare a methanol solution of 2 wt % concentration.

<img>

Further, 1% of an infrared ray absorbing agent IRG002 was added to the above dye and a recording layer was formed by a spin coating method.

After that, a water solution containing 2.5 wt % of polyvinyl alcohol and bichromate ammonium of 5% to this polyvinyl alcohol was prepared. This water solution was spin-coated to laminate a thermally deformable layer having a film thickness of 60 nm.

The thermally deformable layer formed as described above was irradiated by ultraviolet rays from an ultra high pressure mercury lamp for a few minutes so that the polyvinyl alcohol and the bichromate ammonium were cross-linked to form a complex compound of them.

A two side type optical disk was prepared by bonding the optical data recording mediums made as described above with recording sides thereof faced inwardly to form an air gap therebetween.

Data was recorded to this optical disk made as above using various powers with a pulsewidth of 85 n sec. while the disk was rotated at 2400 rpm to measure the modulation degree. A result of the measurement is shown in FIG. 53 together with a measurement of the modulation degree of3a case wherein no thermally deformable layer is formed.

As apparent from FIG. 53, the case provided with the thermally deformable layer results in a larger modulation degree.

In addition, when the disk is read by a reading power of 0.6 mW at a linear velocity of 6 m/s, the number of readings at which a reflection factor is reduced by 10% in a relative value is shown in the following Table I.

TABLE I

| Sample | No. of readings |
| --- | --- |
| A | $1.0 \times 10^6$ |
| B | $8.1 \times 10^5$ |
| C | $2.5 \times 10^4$ |
| D | $1.0 \times 10^3$ |

Note that A-D in Table I show the following contents.
A: the seventeenth embodiment (PVA + infrared ray absorbing agent)
B: a case with no thermally deformable layer (only infrared ray absorbing agent)
C: a case with no addition of infrared ray absorbing agent (only PVA)
D: a case neither with the addition of infrared ray absorbing agent, nor with the thermally deformable layer Note that A-D in Table I show the following contents. A : the seventeenth embodiment (PVA+infrared ray absorbing agent) B : a case with no thermally deformable layer (only infrared ray absorbing agent) C : a case with no addition of infrared ray absorbing agent (only PVA) D : a case neither with the addition of infrared ray absorbing agent, nor with the thermally deformable layer As apparent from Table 1, the eighteenth embodiment (sample A) has a more increased number of readings in comparison with other samples.

It is found that the optimization of a film thickness of the recording layer of the optical data recording medium according to this invention permits a film thickness of the thermally deformable layer (thin layer) to be arbitrarily selected. In particular, the thermally deformable layer having a film thickness of 1 nm or more, and further a film thickness in a range of 1 nm to 40 nm can be protruded and deformed by less energy depending on the kind of organic dye used for the recording layer, and thus this thermally deformable layer is preferable. (Alternatively: such a film thickness is preferable, or the recording layer using this kind of organic dye is preferable)

Advantages of the Invention

As described above, according to the present invention, there are provided an optical data recording medium having a thin layer capable of being formed on a recording layer even if composed of an organic dye type recording material by a spin coating method of high productivity and a manufacturing method thereof, the optical data recording medium being able to reduce a production costs of an optical disk and the like having a DRAW function. In addition, the present invention provides a reliable optical data recording medium having excellent sensitivity wherein pits are clearly shaped to enable signal outputs to rise sharply.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical data recording medium comprising a transparent substrate, a recording layer provided on said substrate, and a thin layer formed on said recording layer with or without an underlayer interposed between said recording layer and said substrate, both of said recording layer and thin layer being applied by a spin coating method,
said recording layer being composed of an organic dye recording material substantially insoluble and non-dispersible in water and said thin layer being composed of a water soluble polymer.

2. An optical recording medium according to claim 1, wherein said thin layer has a film thickness or 10 nm or greater.

3. An optical data recording medium according to claim 1, wherein said thin layer comprises polyvinyl alcohol.

4. An optical data recording medium according to claim 1, wherein an overcoat layer is further provided on said thin layer.

5. An optical data recording medium according to claim 4, wherein said overcoat layer comprises an acrylate resin.

6. An optical data recording medium according to claim 1, wherein said thin layer comprises a material of a water soluble polymer made water insoluble by denaturation.

7. An optical data recording medium according to claim 1, wherein said organic dye comprises an indol type cyanine dye having a methyne chain.

8. An optical data recording medium according to claim 7, wherein said organic dye has the following general formula:

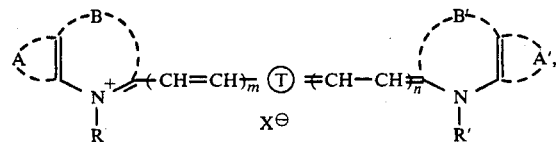

wherein (T) is a carbon chain to form a methyne chain and composed of a linear chain or a polycyclic compound of $C_3$-$C_{17}$, and a hydrogen atom attached to a carbon atom may be substrated by a halogen atom,

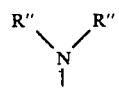

(R" is a linear chain of $C_1$-$C_6$ or an aromatic ring);
A may be equal to or different from A', both of them representing an aromatic ring, respectively, and said hydrogen atom attached to a carbon atom may be substrated by —I, —Br, —Cl, —$C_nH_{2n+1}$(n-=1-22), —$OCH_3$,

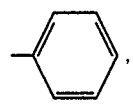

—$NO_2$, and

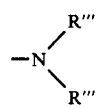

(R''' is a linear chain of a hydrocarbon or an aromatic ring);
B may be equal to or different from B' and both of them represent —O—, —S—, —Se—, —CH=CH—, or

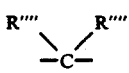

(R'''' is an alkyl group of $C_1$–$C_4$);

R may be equal to or different from R', both of them represent an alkyl group of $C_1$–$C_{22}$ and may be substrated by a sulfonyl group or a carboxyl group;

$X^\ominus$ represents an anion such as $I^\ominus$, $PF_6^\ominus$, $ClO_4^\ominus$, $Cl^\ominus$, $CF_4^\ominus$ or the like; and m and n represent 0 or an integer of 1 through 3, respectively, and have a relationship of $m+n \leq 3$.

9. An optical data recording medium according to claim 7 or 3, wherein said anion is a hexafluoro-phosphate ion.

10. An optical data recording medium according to claim 8, wherein T in said general formula is —CH=CH—CH=   or   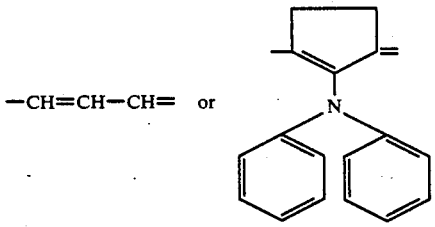

11. An optical data recording medium according to claim 8, wherein A and A' in said general formula are

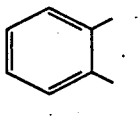

12. An optical data recording medium according to claim 8, wherein B and B' in said general formula are

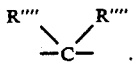

13. An optical data recording medium according to claim 8, wherein R and R' in said general formula are the same alkyl group and may be either $C_2H_5$ or $C_3H_7$.

14. An optical data recording medium according to claim 7, wherein T in said general formula is

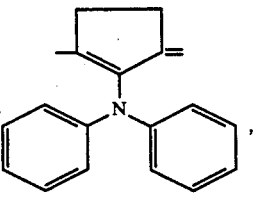

A and A' are

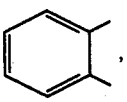

B and B' are

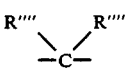

R' and R' are $C_2H_5$, and $X^\ominus$ is $PF_6^\ominus$.

15. An optical data recording medium according to claim 6, wherein said thin layer is cross-linked or a crystallized layer.

16. An optical data recording medium according to claim 6, wherein an overcoat layer is further provided on said thin layer.

17. An optical data recording medium according to claim 16, wherein said overcoat layer comprises an acrylate resin.

18. An optical data recording medium according to claim 16, wherein said thin layer and said overcoat layer are water resistant and heat resistant having been cross-linked or polymerized by an irradiation of ultraviolet rays or the like.

19. An optical data recording medium produced according to the process which comprises:
providing a transparent substrate;
applying a recording layer of a material comprising an organic dye which is substantially insoluble and non-dispersible in water by spin coating; and
applying a thin layer of a material comprising a water soluble polymer by spin coating on said recording layer.

20. An optical data recording medium produced according to the process of claim 19, further including interposing a underlayer between said substrate and said recording layer.

21. An optical data recording medium produced according to the process of claim 19, further including providing an overcoat layer over said thin layer.

22. An optical data recording medium produced according to the process of claim 19, further including the step of cross-linking or crystallizing said thin layer to impart thereto water resistance or heat resistance.

23. An optical data recording medium produced according to the process of claim 21, further including cross-linking or polymerizing said thin layer and said overcoat layer to impart thereto heat resistance and water resistance properties.

* * * * *